United States Patent
Yi et al.

(10) Patent No.: US 12,020,267 B2
(45) Date of Patent: Jun. 25, 2024

(54) METHOD, APPARATUS, STORAGE MEDIUM, AND DEVICE FOR GENERATING USER PROFILE

(71) Applicant: TENCENT TECHNOLOGY (SHENZHEN) COMPANY LIMITED, Shenzhen (CN)

(72) Inventors: Quanzheng Yi, Shenzhen (CN); Bin Hu, Shenzhen (CN); Qiuyong Xiao, Shenzhen (CN); Xiaoxiao Zheng, Shenzhen (CN); Jihong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 198 days.

(21) Appl. No.: 17/672,633

(22) Filed: Feb. 15, 2022

(65) Prior Publication Data
US 2022/0172260 A1    Jun. 2, 2022

Related U.S. Application Data

(63) Continuation of application No. PCT/CN2020/127688, filed on Nov. 10, 2020.

(30) Foreign Application Priority Data

Feb. 7, 2020     (CN) .......................... 202010082465.1

(51) Int. Cl.
    *G06Q 30/02*         (2023.01)
    *G06Q 30/0201*       (2023.01)
    (Continued)

(52) U.S. Cl.
    CPC ......... *G06Q 30/0201* (2013.01); *G06Q 50/01* (2013.01); *H04L 67/306* (2013.01)

(58) Field of Classification Search
None
See application file for complete search history.

(56) References Cited

U.S. PATENT DOCUMENTS 6,029,195 A     2/2000   Herz
8,055,664 B2 *   11/2011   Baluja .................... G06N 20/00
                                                    705/14.7
(Continued)

FOREIGN PATENT DOCUMENTS

CN        106484764 A     3/2017
CN        106503015 A     3/2017
(Continued)

OTHER PUBLICATIONS

M.-H. Chung, G. Chen, W. Zhao, G. Hao, J. Pan and X. Xu, "Discovering Multiple Social Ties for Characterization of Individuals in Online Social Networks," 2016 Third European Network Intelligence Conference (ENIC), Wroclaw, Poland, 2016, pp. 1-8, doi: 10.1109/ENIC.2016.009. (Year: 2016).*

(Continued)

*Primary Examiner* — Vincent M Cao
(74) *Attorney, Agent, or Firm* — ANOVA LAW GROUP, PLLC

(57) ABSTRACT

A method includes: acquiring user characteristic data of a first user and user characteristic data of at least two second users, each of the at least two second users having a social relationship with the first user; clustering the at least two second users to obtain at least two user sets, a similarity between the user characteristic data of any two second users in each user set satisfying a similarity condition; determining first key user characteristic data corresponding to the each user set according to the user characteristic data of the second users in the each user set; and generating a user profile of the first user according to the first key user (Continued)

characteristic data corresponding to the each user set and the user characteristic data of the first user.

17 Claims, 9 Drawing Sheets

(51) Int. Cl.
*G06Q 50/00* (2012.01)
*H04L 67/306* (2022.01)

(56) References Cited

U.S. PATENT DOCUMENTS

| | | | | |
|---|---|---|---|---|
| 8,086,690 | B1* | 12/2011 | Heymans | G06Q 30/0261 |
| | | | | 709/217 |
| 10,140,327 | B2 | 11/2018 | Elkherj et al. | |
| 2013/0346182 | A1* | 12/2013 | Cheng | G06Q 30/0242 |
| | | | | 705/14.41 |
| 2014/0089327 | A1* | 3/2014 | Pavlidis | G06F 16/40 |
| | | | | 707/749 |
| 2015/0049634 | A1* | 2/2015 | Levchuk | H04L 41/12 |
| | | | | 370/254 |
| 2016/0034853 | A1* | 2/2016 | Wang | G06F 16/24578 |
| | | | | 705/321 |
| 2017/0178157 | A1* | 6/2017 | Jayaram | G06Q 30/0202 |
| 2019/0073411 | A1* | 3/2019 | Booker | G06F 16/955 |
| 2019/0303771 | A1 | 10/2019 | Soong et al. | |

FOREIGN PATENT DOCUMENTS

| | | | | |
|---|---|---|---|---|
| CN | 108288229 | A | 7/2018 | |
| CN | 109784959 | A | 5/2019 | |
| CN | 109978608 | A | 7/2019 | |
| CN | 110162692 | A | 8/2019 | |
| CN | 110413897 | A | 11/2019 | |
| CN | 111275492 | A | 6/2020 | |
| EP | 3136332 | A1 | 3/2017 | |
| WO | WO-2014000431 | A1 * | 1/2014 | ......... G06F 16/9535 |
| WO | WO-2015094370 | A1 * | 6/2015 | ......... G06K 9/00288 |

OTHER PUBLICATIONS

The State Intellectual Property Office of the People's Republic of China (SIPO) Office Action 1 for for 202010082465.1 dated Dec. 9, 2020 15 Pages (including translation).
The World Intellectual Property Organization (WIPO) International Search Report for PCT/CN2020/127688 dated Feb. 20, 2021 6 Pages (including translation).
Zhiqin Wu et al., "Research on the construction of user portraits in university libraries based on social networks," Library Science Research, Issue 16, Aug. 31, 2018 (Aug. 31, 2018). 6 pages.
Shudong Chen, "Research on user portrait technology based on user consumption behavior," China Excellent Master's Thesis Full-text Database Information Technology Series, Issue 12, pp. 14-56, Jan. 15, 2019 (Jan. 15, 2019). 44 pages.
M. B. Christopher, "Pattern recognition and machine learning," Company New York, 2006, 16(4): 049901. 758 pages.
H. G. Sung et al., "Gaussian Mixture Regression and Classification," Dissertation Abstracts International, vol. 65-02, Section: B, p. 0824.;Chair: David W. Scott. 2004. 117 pages.

* cited by examiner

METHOD, APPARATUS, STORAGE MEDIUM, AND DEVICE FOR GENERATING USER PROFILE

RELATED APPLICATION

This application is a continuation application of PCT Patent Application No. PCT/CN2020/127688 filed on Nov. 10, 2020, which claims priority to Chinese Patent Application No. 202010082465.1, entitled "METHOD, APPARATUS, STORAGE MEDIUM, AND DEVICE FOR GENERATING USER PROFILE" and filed with the China National Intellectual Property Administration on Feb. 7, 2020, all of which are incorporated herein by reference in entirety.

FIELD OF THE TECHNOLOGY

The present disclosure relates to the field of artificial intelligence (AI) technologies, and in particular, to a method, apparatus, storage medium, and device for generating a user profile.

BACKGROUND

User profiling is a technology used for describing user characteristics, for example, acquiring label attributes for a user, and then using these label attributes to describe various characteristics of the user. User profiling can be used to mine user needs, analyze user preferences, and so on. Targeted information can be provided to users by matching user profiles.

A user profile of a user may be obtained by analyzing contents posted by the user to social web pages. If a user does not frequently post contents in social web pages, information related to the user that can be acquired from the social web pages may be limited, and a user profile generated based on such a limited amount of information may not be informative enough.

SUMMARY

In one aspect, the present disclosure provides a method for generating a user profile, the method including: acquiring user characteristic data of a first user and user characteristic data of at least two second users, each of the at least two second users having a social relationship with the first user; clustering the at least two second users to obtain at least two user sets, a similarity between the user characteristic data of any two second users in each user set satisfying a similarity condition; determining first key user characteristic data corresponding to the each user set according to the user characteristic data of the second users in the each user set; and generating a user profile of the first user according to the first key user characteristic data corresponding to the each user set and the user characteristic data of the first user.

In another aspect, the present disclosure provides an apparatus for generating a user profile, the apparatus including: a memory storing computer program instructions; and a processor coupled to the memory and configured to execute the computer program instructions and perform: acquiring user characteristic data of a first user and user characteristic data of at least two second users, each of the at least two second users having a social relationship with the first user; clustering the at least two second users to obtain at least two user sets, a similarity between the user characteristic data of any two second users in each user set satisfying a similarity condition; determining first key user characteristic data corresponding to the each user set according to the user characteristic data of the second users in the each user set; and generating a user profile of the first user according to the first key user characteristic data corresponding to the each user set and the user characteristic data of the first user.

In yet another aspect, the present disclosure provides a non-transitory computer-readable storage medium storing computer program instructions executable by at least one processor to perform: acquiring user characteristic data of a first user and user characteristic data of at least two second users, each of the at least two second users having a social relationship with the first user; clustering the at least two second users to obtain at least two user sets, a similarity between the user characteristic data of any two second users in each user set satisfying a similarity condition; determining first key user characteristic data corresponding to the each user set according to the user characteristic data of the second users in the each user set; and generating a user profile of the first user according to the first key user characteristic data corresponding to the each user set and the user characteristic data of the first user.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
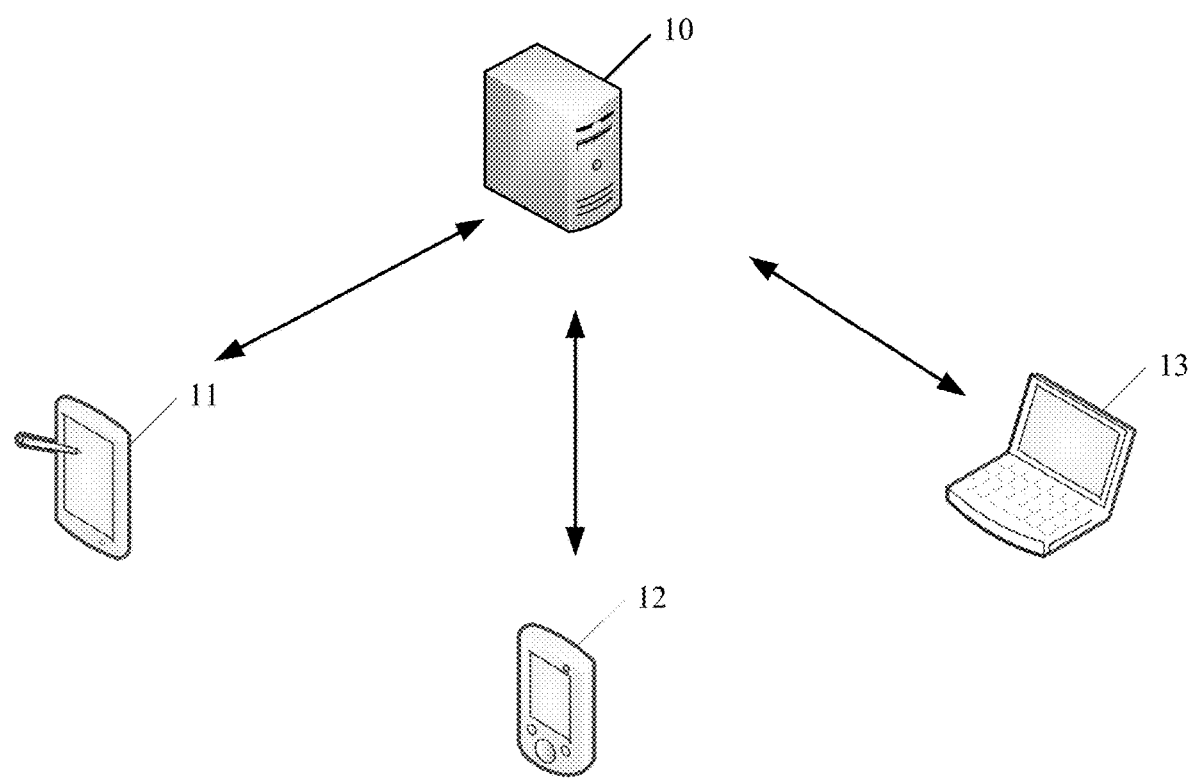
FIG. 1 is a schematic architectural diagram of a system for generating a user profile according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Artificial intelligence (AI) is a theory, method, technology, and implementation system in which a digital computer or a machine controlled by a digital computer is used to simulate, extend, and expand human intelligence, sense an environment, acquire knowledge, and use the knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

AI technology covers a wide range of fields including both hardware-level technologies and software-level technologies. AI hardware technologies generally include technologies such as sensors, dedicated AI chips, cloud computing, distributed storage, user profiling technologies, operating/interaction systems, and mechatronics. AI software technologies may include a computer vision technology, a speech processing technology, a natural language processing (NLP) technology, machine learning/deep learning, and the like. ML is a multi-field interdiscipline and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. Machine learning is the core of artificial intelligence and is the fundamental way to make computers intelligent. Its implementations cover various fields of artificial intelligence, such as user profiling, unmanned driving, autonomous driving, drones, robots, intelligent medical care, intelligent customer service, etc.

User profiling involved in artificial intelligence technologies is a technology used for describing user characteristics. User profiling is used in the following aspects: (1) Precision marketing: To analyze potential users of a product are analyzed based on user profiles, so as to conduct marketing for the potential users. (2) User statistics: such as collecting statistics on the employment of college students nationwide based on user profiles. (3) Data mining: to build an intelligent recommendation system, for example, analyze which sports brands people who like wine like through profile data. (4) To evaluate the effect of the product according to user profiles, so as to enhance the product operation and improve the service quality. (5) To provide a customized service or product based on user profiles. (6) To analyze the business operation and competition based on user profiles to formulate corporate development strategies. It can be seen that user profiling is the core technology in the fields such as precision marketing and big data analysis. Therefore, how to acquire informative user profiles is an urgent problem to be solved. Based on this, an embodiment of the present disclosure provides a method for generating a user profile. By this method, a more informative user profile can be generated.

First, a system for generating a user profile, to which this method is applied, is introduced. Referring to FIG. 1, FIG. 1 shows a system for generating a user profile according to an embodiment of the present disclosure. The system for generating a user profile includes a server 10 and at least one terminal. FIG. 1 shows three terminals, namely, a terminal 11, a terminal 12, and a terminal 13, by way of example.

The terminal 11, the terminal 12, and the terminal 13 are user-oriented terminals, in certain embodiment(s), the terminal 11, the terminal 12, and the terminal 13 are terminals configured to record user behavior data and a basic attribute. The terminal 11, the terminal 12, and the terminal 13 may be smart devices such as smart phones, tablet computers, portable personal computers, smart watches, smart bands, and smart televisions.

The server 10 may be a device configured to acquire user behavior data and a basic attribute, and generate user profiles based on the user behavior data and the basic attribute. The server 10 may be an independent server, or a server cluster consisting of several servers, or a cloud computing center.

The user behavior data may include, but is not limited to: a web page browsed by a user, an application program installed, an official account that the user follows, an applet added by the user, a product purchased by the user, an article read by the user, a content published on a content interaction platform, and so on. The content interaction platform may be a platform for publishing and viewing contents, for example, social software or an official account, or a web page such as a forum space. The official account may be an application account, which can realize all-round communication and interaction with a specific group via text, pictures, voice, and video. The applet may be an application that can be used without downloading an installation package. The basic attribute may include the user's age, gender, birthplace, and so on.

For example, as shown in FIG. 2_a_, when a user profile of a user 1 corresponding to the terminal 11 is to be acquired, the server 10 may acquire user characteristic data of the user 1 and user characteristic data of friend users of the user 1. FIG. 2_a_ shows an example where the friend users of the user 1 are users 2 to 101. The user characteristic data includes the basic attribute and the user behavior data that are described above. A friend user may refer to a user who has a social relationship with the user 1. The social relationship may refer to a state that social accounts of two users follow each other (are friends to each other), or the social relationship may refer to that two users belong to the same communication group. The communication group may be a group of friends, a group of colleagues, a group of relatives, etc. The social relationship may mean that two users follow the same topic (such as fitness, travel, etc.), or follow the same official account, and so on.

Figure 2A:
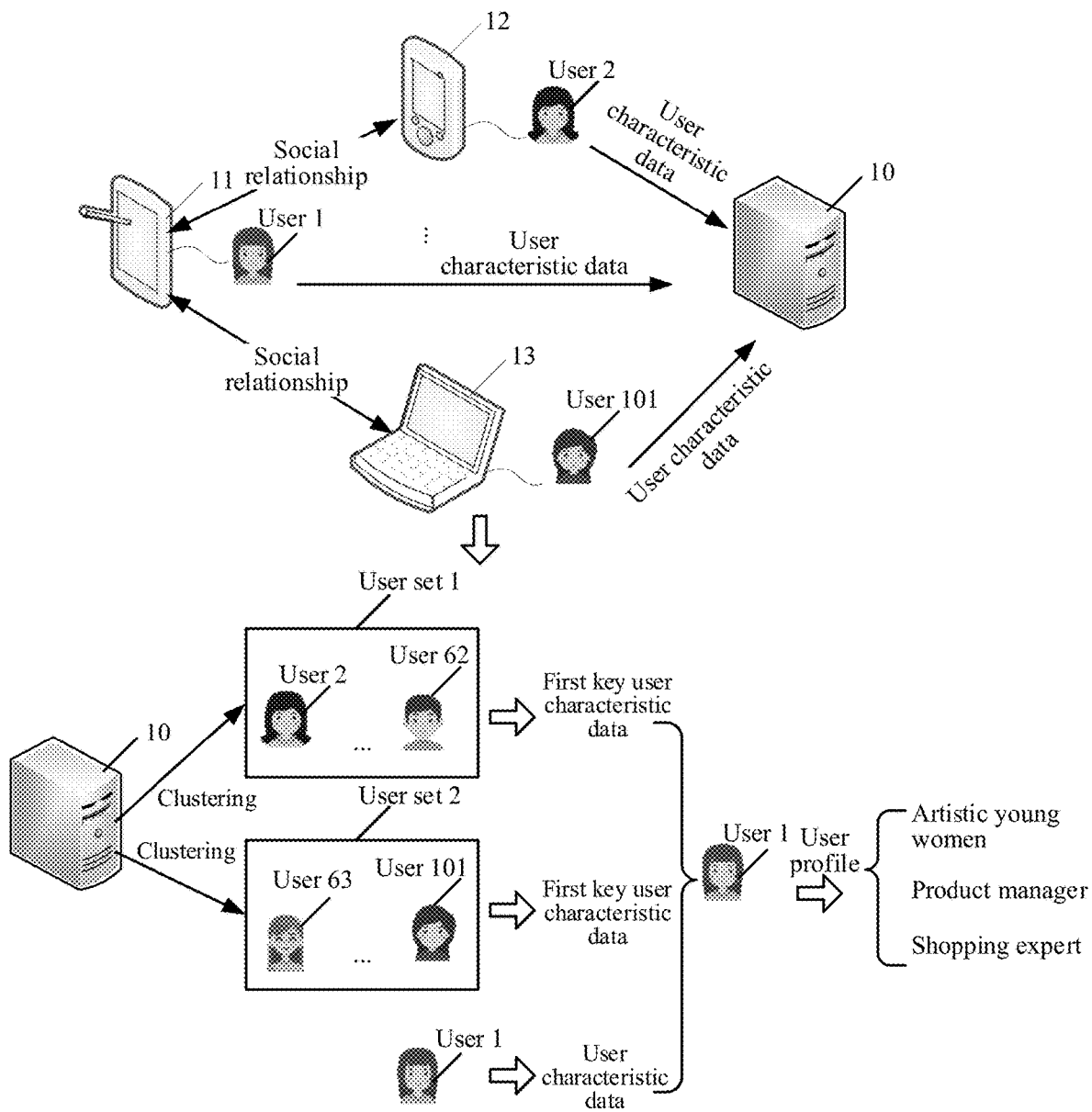
FIG. 2a is a schematic diagram of an implementation scenario of a method for generating a user profile according to embodiment(s) of the present disclosure.

After acquiring the user characteristic data, the server 10 may cluster the friend users to obtain at least two user sets, where the friend users in the same user set have similar user characteristic data. As shown in FIG. 2a, the server 10 may cluster the users 2 to 62 into a user set 1, and cluster the users 63 to 101 into a user set 2. The server 10 may determine first key user characteristic data corresponding to the user set 1 according to the user characteristic data of the friend users in the user set 1. The first key user characteristic data corresponding to the user set 1 is used for reflecting key information of the user characteristic data of the friend users in the user set 1. The server 10 may determine first key user characteristic data corresponding to the user set 2 according to the user characteristic data of the friend users in the user set 2. The first key user characteristic data corresponding to the user set 2 is used for reflecting key information of the user characteristic data of the friend users in the user set 2.

After acquiring the first key user characteristic data corresponding to each user set, the server 10 may determine a user profile of the user 1 according to the first key user characteristic data of each user set and the user characteristic data of the user 1, in certain embodiment(s), may determine a label attribute of the user 1 according to the first key user characteristic data of each user set and the user characteristic data of the user 1 and use the label attribute of the user 1 to construct the user profile of the user 1. As shown in FIG. 2a, the label attribute of the user 1 includes artistic young women, product manager, shopping expert, etc., where product manager refers to the occupation of the user 1, artistic young women indicates that the user 1 is female and has a quiet temperament, and shopping expert indicates that the user 1 likes shopping.

Figure 2B:
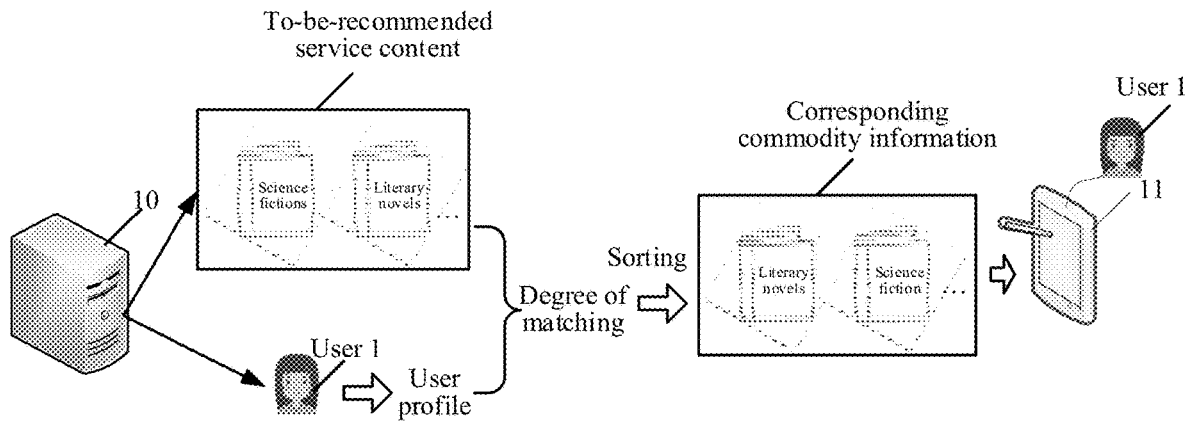
FIG. 2b is a schematic diagram of an implementation scenario of a method for generating a user profile according to embodiment(s) of the present disclosure.

As shown in FIG. 2b, after obtaining the user profile of the user 1, the server 10 may apply the user profile of the user 1 to the fields such as precision marketing, intelligent recommendation, and big data analysis. Taking intelligent recommendation as an example, the server 10 may acquire at least two to-be-recommended service contents, acquire a degree of matching between the user profile of the user 1 and each of the at least two to-be-recommended service contents, sort the to-be-recommended service contents according to the degree of matching, and push the sorted service contents to the user 1.

In certain embodiment(s), the term "to-be-recommended service contents" is interchangeable with "service contents," and the term "to-be-recommended service content" is interchangeable with "service content."

The service content may refer to commodity information corresponding to a commodity or service information corresponding to a service. The commodity may include books, clothing, sports equipment, and daily necessities, etc. The commodity information may include an image, video, price, type, purchase address, etc. of the commodity. The service may include online courses, information consultation, psychological counseling, etc. The service information may include service content, price, purchase address, service duration, etc. FIG. 2b shows an example where the service content includes information about books. The books include science fictions and literary novels. The server 10 may acquire a degree of matching between the user profile of the user 1 and each of literary novels and science fictions. If the degree of matching between the user profile of the user 1 and literary novels is larger, the server 10 may determine that the user 1 is more interested in literary novels. Therefore, the server may rank literary novels before science fictions, and push commodity information respectively corresponding to literary novels and science fictions to the user 1 in this order. It can be seen that by acquiring user characteristic data of a user and user characteristic data of friend users of the user, richer user characteristic data can be provided, so that a more informative user profile can be generated.

The above step of acquiring the user profile of the user 1 may be executed by the server 10, or may be executed by any terminal in the system for generating a user profile, which is not limited in the present disclosure.

Figure 3:
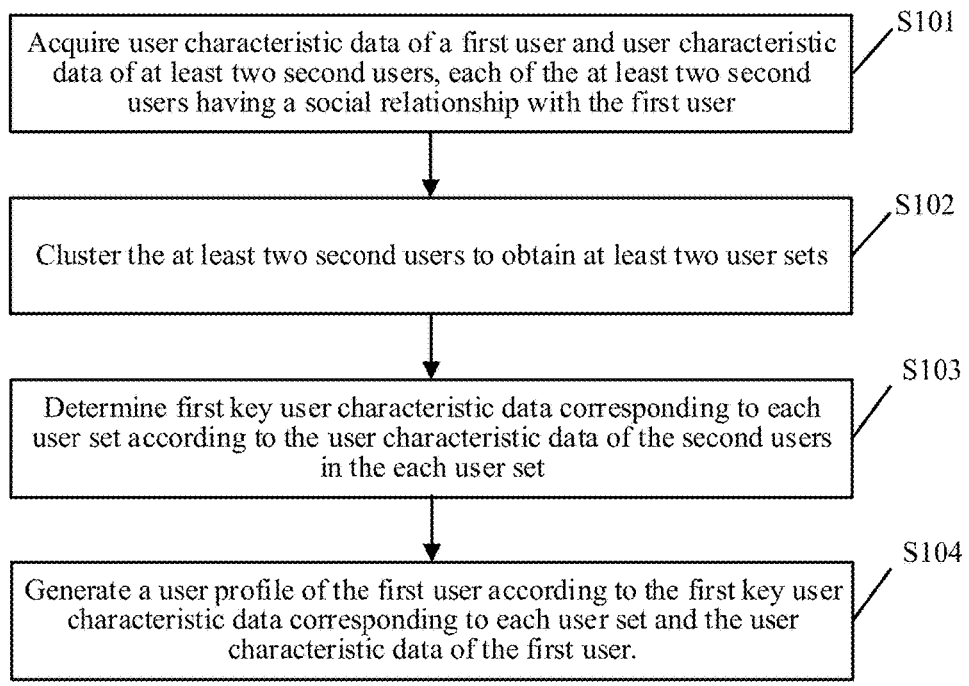
FIG. 3 is a schematic flowchart of a method for generating a user profile according to embodiment(s) of the present disclosure.

Based on the description, refer to FIG. 3, which is a schematic flowchart of a method for generating a user profile according to an embodiment of the present disclosure. The method may be executed by a computing device. The computing device may be a terminal or the server in FIG. 1. As shown in FIG. 3, the method may include the following steps:

S101: Acquire user characteristic data of a first user and user characteristic data of at least two second users, each of the at least two second users having a social relationship with the first user.

The first user may refer to a user for whom a user profile is to be acquired. The second user refers to a user who has a social relationship with the first user, in certain embodiment(s), the second user is a friend user of the first user. In certain embodiment(s), the second user may refer to a user selected from users who have a social relationship with the first user; or, the second user may refer to a user whose intimacy with the first user is greater than an intimacy threshold among users who have a social relationship with the first user. The intimacy may be determined according to the frequency of communication with the first user, how long the first user and the second user have followed each other, and so on. The number of second users in the at least two second users may be dynamically determined according to the total number of users who have a social relationship with the first user, or the number of second users in the at least two second users may be fixed.

In certain embodiment(s), the user characteristic data may refer to the behavior data and the basic attribute; or, the user characteristic data may refer to data obtained by quantifying the behavior data and basic attribute. For example, it is assumed that the behavior data includes application programs installed by the user 1, and the application programs installed by the user 1 include application program A and application program B. Numerical values may be used to represent the application programs installed by the user 1. For example, a numerical value 1 is used to represent the application program A installed by the user 1, and a numerical value 2 is used to represent the application program B installed by the user 1. That is to say, the user characteristic data of the user 1 includes 1 and 2.

The user characteristic data may include one or more sets of user characteristic data of user attributes. For example, if the user characteristic data includes user characteristic data corresponding to age, gender, etc., the user characteristic data corresponding to the age may be referred to as a set of user characteristic data of user attributes, and user characteristic data corresponding to the gender may also be referred to as a set of user characteristic data of user attributes.

If there is a social relationship between two users, it indicates that the two users have the same or similar hobbies, occupations, ages, etc. to a certain extent, in certain embodiment(s), the two users have similar or the same user characteristic data. Therefore, when it is desirable to acquire the user profile of the first user, the computing device may acquire the user characteristic data of the first user from a terminal corresponding to the first user, acquire at least two second users who have a social relationship with the first user, and acquire the user characteristic data of the second users from terminals corresponding to the second users. Alternatively, the computing device may acquire the user characteristic data of the first user, at least two second users who have a social relationship with the first user, and the user characteristic data of the second users from an application server. By acquiring the user characteristic data of the first user and the at least two second users, the problem that the amount of information provided by the user characteristic data of the first user is too small to generate an informative user profile of the first user can be avoided. In other words, by acquiring the user characteristic data of the at least two users, richer user characteristic data can be provided. Therefore, by introducing the user characteristic data of the friend users, the user profile of the first user can be more adequately predicted.

In certain embodiment(s), the computing device may acquire user characteristic data of multiple sets of candidate user attributes of the first user, and user characteristic data of multiple sets of candidate user attributes of the at least two second users, and determine an importance evaluation result of the user characteristic data of each set of candidate user attributes. The importance evaluation result may be statistically obtained during the historical user profile generation processes. The importance evaluation result is used for indicating the degree of influence of the user characteristic data of the set of user attributes on the user profile generation. Therefore, the computing device may select user characteristic data of N sets of candidate user attributes from the user characteristic data of the multiple sets of candidate user attributes of the first user as the user characteristic data of the first user by screening according to the importance evaluation results; and respectively select user characteristic data of M sets of candidate user attributes from the user characteristic data of the multiple sets of candidate user attributes of each of the at least two second users as the user characteristic data of the each of the at least two second users by screening according to the importance evaluation results. That is to say, the user characteristic data is screened based on the importance evaluation results, which can avoid processing of unnecessary user characteristic data, thereby save resources and improving the efficiency of user profile generation. The unnecessary user characteristic data may refer to user characteristic data that has little influence on the user profile generation.

S102: Cluster the at least two second users to obtain at least two user sets, a similarity between the user characteristic data of any two second users in each user set satisfying a similarity condition.

S103: Determine first key user characteristic data corresponding to each user set according to the user characteristic data of the second users in the each user set.

In step S102 and step S103, the computing device may use a clustering algorithm to cluster the at least two second users to obtain at least two user sets, where a similarity between the user characteristic data of any two second users in each user set satisfies a similarity condition. That the similarity between the user characteristic data of any two second users in each user set satisfies the similarity condition may mean that the user characteristic data of any two second users in each user set is the same or is similar to each other by a degree greater than a similarity threshold; or, may mean that a difference between the user characteristic data of any two second users in each user set is within a difference range.

The clustering algorithm may include, but is not limited to, a fixed clustering algorithm and a non-fixed clustering algorithm. The fixed clustering algorithm may refer to a clustering algorithm in which the number of user sets to be generated is a known parameter. The fixed clustering algorithm may include K-Means (K-means clustering algorithm) and Gaussian clustering algorithm, etc. The non-fixed clustering algorithm refers to a clustering algorithm in which the number of user sets to be generated is an unknown parameter. The non-fixed clustering algorithm may include a DBSCAN algorithm, etc.

After acquiring the user sets, the computing device may fit the user characteristic data of the second users in each user set to obtain first key user characteristic data corresponding to each user set, where the first key user characteristic data may be used for reflecting key information of the first user characteristic data of the second users in the user set. By acquiring the first key user characteristic data corresponding to each user set, the problem that a user profile cannot be more adequately generated due to the lack of key information of the user characteristic data of the second user can be avoided.

S104: Generate a user profile of the first user according to the first key user characteristic data corresponding to each user set and the user characteristic data of the first user.

The computer equipment may recognize the first key user characteristic data corresponding to each user set and the user characteristic data of the first user by using a machine learning model to obtain a user profile of the first user. The machine learning model may include, but is not limited to, a linear classifier (such as LR), support vector machine (SVM), naive Bayes (NB), K nearest neighbors (KNN), decision tree (DT), integrated model (RF/GDBT, etc.).

Alternatively, key fields in the first key user characteristic data corresponding to each user set and the user characteristic data of the first user may be analyzed, to generate a user profile of the first user. The key fields may refer to fields associated with the user's label attributes, for example, gender (in certain embodiment(s), male or female), occupation (such as product manager or R&D engineer), and so on. Because the user profile of the first user is generated according to the first key user characteristic data corresponding to each user set and the user characteristic data of the first user, there may not be a need to generate a user profile of the first user according to the user characteristic data of each second user, which can improve the efficiency of user profile generation and reduce the complexity of user profile generation.

In certain embodiment(s), if it is desirable to obtain a user profile of a certain second user, the computing device may acquire friend users of the second user. If the friend users of the second user are the same or similar to the friend users of the first user, a user profile of the second user may be generated based on the user profile of the first user, for example, the user profile of the first user is used as the user profile of the second user; or, a user profile of the second user may be generated according to the first key user characteristic data corresponding to the friend users of the first user and the user characteristic data of the second user.

In the embodiments of the present disclosure, the computing device may acquire the user characteristic data of the first user and the user characteristic data of at least two second users to avoid the problem that the amount of information provided by the user characteristic data of the first user is insufficient. That is, by acquiring the user characteristic data of the first user and the at least two second users, richer user characteristic data can be provided, so that a more informative user profile can be generated. After acquiring the user characteristic data, the computing device may cluster the at least two second users to obtain at least two user sets, and determine first key user characteristic data corresponding to each user set according to the user characteristic data of the second users in the each user set. The first key user characteristic data can reflect key information of the user characteristic data of the second user in the user set, in certain embodiment(s), the first key user characteristic data is more prominent and representative, and can truly reflect the distribution of user characteristic data of the friend users of the first user. Therefore, by acquiring the first key user characteristic data corresponding to each user set, the problem that a user profile cannot be more adequately generated due to the lack of key information of the user characteristic data of the second user can be avoided. Since the user characteristic data of the first user is similar to the user characteristic data of the second users, a user profile of the first user can be generated according to the user characteristic data of the first user and the first key user characteristic data of each user set. In this way, the accuracy of the user profile generated is improved.

In an embodiment, step S102 may include the following steps s11 to s14:

s11: Acquire a category number corresponding to the user characteristic data of the at least two second users as a first number.

s12: Acquire a Gaussian mixture model according to the first number, where the Gaussian mixture model includes at least two Gaussian components, and assuming that K is the number of Gaussian components in the at least two Gaussian components, K is the same as the first number.

s13: Acquire a probability that the user characteristic data of each of the at least two second users belongs to an i-th Gaussian component as a target probability, where i is a positive integer less than or equal to K.

s14: Cluster the second users whose target probability is greater than a probability threshold among the at least two second users to obtain a user set corresponding to the i-th Gaussian component.

In steps s11 to s14, the computing device may use a fixed clustering algorithm to cluster the at least two second users. Since the Gaussian mixture model can better reflect the distribution of user characteristic data, the at least two second users may also be clustered using the Gaussian mixture model in the embodiments of the present disclosure. In certain embodiment(s), because different users have different numbers of friend users, or the distribution of user characteristic data of friend users vary with different users, different users correspond to different numbers of pieces of first key user characteristic data, in certain embodiment(s), correspond to user characteristic data of different lengths (in certain embodiment(s), dimensions).

The user characteristic data of different lengths will increase the difficulty of recognizing a user profile and reduce the accuracy of recognizing a user profile. Therefore, in order to generate user characteristic data of the same length, the computing device may cluster at least two second users according to the number of categories.

In certain embodiment(s), the computing device may acquire a category number corresponding to the user characteristic data of the at least two second users as a first number, where the category number may be used for indicating that the user characteristic data of the at least two users is to be clustered into the first number of categories, and each category corresponds to one user set, in certain embodiment(s), the category number may be used for indicating that the at least two users are to be clustered into the first number of user sets. The category number corresponding to the user characteristic data of each set of user attributes is fixed, and the category numbers corresponding to the user characteristic data of different user attributes may be the same or different. For example, the category number corresponding to user characteristic data of age may be 2, which is used for indicating that the at least two users are to be clustered into 2 user sets; the category number corresponding to user characteristic data of hobbies may be 3, which is used for indicating that the at least two users are to be clustered into 3 user sets.

After acquiring the category number, the computing device may acquire a Gaussian mixture model according to the first number, where the Gaussian mixture model includes at least two Gaussian components, and the number of Gaussian components in the at least two Gaussian components is the same as the first number. The Gaussian mixture model is used for more adequately quantifying an object using a Gaussian probability density function (normal distribution curve). It decomposes an object into several models based on the Gaussian probability density function (normal distribution curve). The Gaussian mixture model may be configured to cluster at least two second users. The computing device may acquire the probability that the user characteristic data of each of the at least two second users belongs to the i-th Gaussian component as the target probability, in certain embodiment(s), respectively input the user characteristic data of the at least two second users into the i-th Gaussian component to calculate the target probabilities. A higher target probability indicates that the i-th Gaussian component can better describe the user characteristic data corresponding to the second user, in certain embodiment(s), the user characteristic data corresponding to the second user is more consistent with the distribution of the i-th Gaussian component. A lower target probability indicates that the i-th Gaussian component cannot describe the user characteristic data corresponding to the second user, in certain embodiment(s), the user characteristic data corresponding to the second user differs greatly from the distribution of the i-th Gaussian component. Therefore, the computing device may cluster the second users whose target probability is greater than a probability threshold among the at least two second users to obtain a user set corresponding to the i-th Gaussian component.

Figure 4:
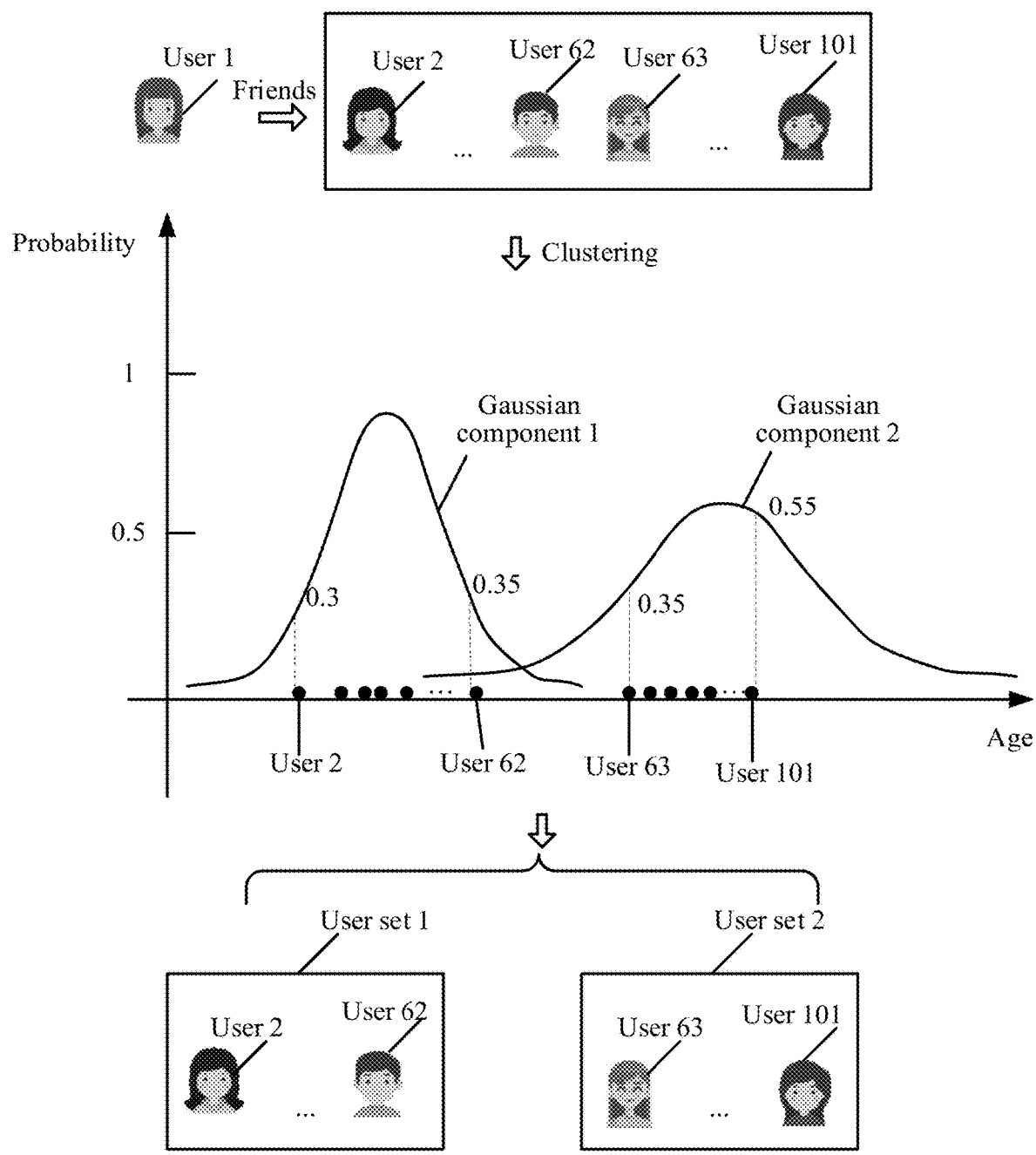
FIG. 4 is a schematic diagram of a scenario for clustering at least two second users according to embodiment(s) of the present disclosure.

For example, as shown in FIG. 4, the user characteristic data of the at least two second users is user characteristic data of the age attribute, and may refer to age; and the friend users of the user 1 include users 2 to 101, and the category number corresponding to the age of the friend user is 2. The computing device may acquire a Gaussian mixture model, where the Gaussian mixture model includes two Gaussian components, in certain embodiment(s), Gaussian component 1 and Gaussian component 2. As shown in FIG. 4, Gaussian component 1 and Gaussian component 2 both satisfy the normal distribution. The shape of the curve corresponding to Gaussian component 1 is similar to that of the curve corresponding to Gaussian component 2, but positions of the curve corresponding to Gaussian component 1 and the curve corresponding to Gaussian component 2 are different, in certain embodiment(s), Gaussian component 1 and Gaussian component 2 correspond to different original parameters. The original parameter may be obtained by randomizing the Gaussian mixture model.

The Gaussian component may include multiple original parameters, which may include a component weight, an expected value, a covariance matrix, and so on. The component weight is used for indicating a proportion of the corresponding Gaussian component in the Gaussian mixture model, in certain embodiment(s), to indicate an importance of the corresponding Gaussian component in the Gaussian mixture model. The expected value is used for indicating a degree of dispersion between user characteristic data belonging to the corresponding Gaussian component. The variance matrix is used for indicating an error between user characteristic data belonging to the corresponding Gaussian component.

After acquiring the Gaussian mixture model, the computing device may acquire a probability that the age of each second user belongs to each of the Gaussian component 1 and the Gaussian component 2. As shown in FIG. 4, the probability that the age of the user 2 belongs to the Gaussian component 1 is 0.3, and the probability that the age of the user 2 belongs to the Gaussian component 2 approaches 0. Therefore, it may be determined that the user 2 belongs to the Gaussian component 1. The probability that the age of the user 62 belongs to the Gaussian component 1 is 0.35, and the probability that the age of the user 62 belongs to the Gaussian component 2 approaches 0. Therefore, it may be determined that the user 62 belongs to the Gaussian component 1. The probability that the age of the user 63 belongs to the Gaussian component 1 approaches 0, and the probability that the age of the user 63 belongs to the Gaussian component 2 is 0.35. Therefore, it may be determined that the user 63 belongs to the Gaussian component 2. The probability that the age of the user 101 belongs to the Gaussian component 1 approaches 0, and the probability that the age of the user 101 belongs to the Gaussian component 2 is 0.55. Therefore, it may be determined that the user 101 belongs to the Gaussian component 2. By repeating the above steps, the friend users of the user 1 may be clustered to obtain two user sets, in certain embodiment(s), user set 1 and user set 2, where the user set 1 includes users 2 to 62, and the user set 2 includes users 63 to 101.

In this an embodiment, step s13 may include the following steps s21 to s23:

s21: Acquire the probability that the user characteristic data of each of the at least two second users belongs to the i-th Gaussian component as a first probability.

s22: Update an original parameter of the i-th Gaussian component by using the first probability to obtain an updated i-th Gaussian component.

s23: Determine the first probability as the target probability when or in response to determining that the updated i-th Gaussian component is in a convergent state.

In steps s21 to s23, in order to improve the accuracy of acquiring the target probabilities, the computing device may acquire the target probabilities through multiple iterations. In certain embodiment(s), the computing device may acquire the probability that the user characteristic data of each of the at least two second users belongs to the i-th Gaussian component as a first probability, and update an original parameter of the i-th Gaussian component by using the first probability to obtain an updated i-th Gaussian component. Further, it is determined whether the updated i-th Gaussian component is in a convergent state. If the updated i-th Gaussian component is not in the convergent state, it indicates that the updated i-th Gaussian component cannot more adequately cluster the at least two second users. The probability that the user characteristic data of each of the at least two second users belongs to the updated i-th Gaussian component may be acquired as a second probability, and a parameter of the updated i-th Gaussian component is continuously updated according to the second probability. The above steps are continuously repeated until the updated i-th Gaussian component is in the convergent state. If the updated i-th Gaussian component is in the convergent state, it indicates that the updated i-th Gaussian component can more adequately cluster the at least two second users, and step s23 may be performed.

In certain embodiment(s), a distribution function of the Gaussian mixture model may be expressed by the following formula (1):

$$p(X|\lambda) = \sum_{i=1}^{K} \omega_i N(X|\mu_i, \Sigma_i) \tag{1}$$

where $p(X|\lambda)$ represents the distribution function of the Gaussian mixture model, K represents the number of Gaussian components in the Gaussian mixture model, $\omega_i$ is a component weight of the i-th Gaussian component, and $\Sigma_{i=1}^{K} \omega_i = 1$ is satisfied. $N(X|\mu_i, \Sigma_i)$ represents the i-th Gaussian component, $\mu_i$ and $\Sigma_i$ respectively represent an expected value and a covariance matrix of the i-th Gaussian component, $\lambda$ is the original parameter of the i-th Gaussian component, $\lambda = \{\omega_i, \mu_i, \Sigma_i\}$, and X represents a random variable.

After acquiring the user characteristic data of the at least two second users, the computing device may use the user characteristic data of the at least two second users as a random variable to calculate the probability that the user characteristic data of each second user belongs to the i-th Gaussian component. In certain embodiment(s), the following steps may be included.

Step 1: Calculate the probability that the user characteristic data of each second user belongs to the i-th Gaussian component as the first probability. The first probability may be expressed by the following formula (2):

$$\gamma(n, i) = \frac{\omega_i N(x_n|\mu_i, \Sigma_i)}{\sum_{j=1}^{K} \omega_j N(x_n|\mu_j, \Sigma_j)} \tag{2}$$

In formula (2), $\gamma(n, i)$ represents the probability that the user characteristic data of the n-th second user belongs to the i-th Gaussian component, n may be a positive integer less than Q, and Q is the number of second users in the at least two second users.

Step 2: Use the first probability to update original parameters of the i-th Gaussian component to obtain updated parameters. The updated parameters include an updated expected value, covariance matrix, and component weight. The updated component weight may be expressed by the following formula (3):

$$\omega'_i = \frac{N_i}{K} \tag{3}$$

In formula (3), $\omega_i'$ represents the component weight of the i-th updated Gaussian component, $N_i$ represents the number of second users whose user characteristic data belongs to the i-th Gaussian component among the at least two second users, and $N_i$ may be expressed by the following formula (4):

$$N_i = \sum_{n=1}^{Q} \gamma(n, i) \tag{4}$$

where the updated expected value may be expressed by the following formula (5):

$$\mu_i' = \sum_{n=1}^{Q} \gamma(n, i) x_n \tag{5}$$

where $\mu_i'$ in formula (5) represents the updated expected value. The updated covariance matrix may be expressed by the following formula (6):

$$\Sigma_i' = \sum_{n=1}^{Q} \gamma(n, i)(x_n - \mu_i')(x_n - \mu_i')^T \tag{6}$$

where $\Sigma_i'$ in formula (6) represents the updated covariance matrix.

The i-th Gaussian component is updated using the updated parameters to obtain an updated i-th Gaussian component, in certain embodiment(s), the updated i-th Gaussian component is $N(X|\mu_i', \Sigma_i')$. If the updated i-th Gaussian component is in the convergent state, the first probability may be used as the target probability; if the updated i-th Gaussian component is not in the convergent state, the above steps 1 and 2 may be repeated until the updated i-th Gaussian component is in the convergent state.

In certain embodiment(s), the method may further include the following steps s31 to s33.

s31: Acquire the probability that the user characteristic data of each of the at least two second users belongs to the updated i-th Gaussian component as a second probability.

s32: Acquire a difference between the first probability and the second probability.

s33: When or in response to determining that the difference between the first probability and the second probability is less than a first difference threshold, determining that the updated i-th Gaussian component is in the convergent state.

In steps s31 to s33, the computing device may determine whether the updated i-th Gaussian component is in the convergent state according to the probabilities. In certain embodiment(s), the computing device may acquire the probability that the user characteristic data of each of the at least two second users belongs to the updated i-th Gaussian component as a second probability, and acquire a difference between the first probability and the second probability. If the differences corresponding to the second users among the at least two second users are less than a first difference threshold, it is determined that the updated i-th Gaussian component is in the convergent state; or, if the at least two second users are If the differences corresponding to most of the second users among the at least two second users are less than the first difference threshold, it is determined that the updated i-th Gaussian component is in the convergent state.

In certain embodiment(s), the method may further include the following steps s41 to s43.

s41: Acquire a parameter of the updated i-th Gaussian component as an updated parameter.

s42: Acquire a difference between the updated parameter and the original parameter.

s43: When or in response to determining that the difference between the updated parameter and the original parameter is less than a second difference threshold, determining that the updated i-th Gaussian component is in the convergent state.

In steps s41 to s43, the computing device may determine whether the updated i-th Gaussian component is in the convergent state according to the parameters of the updated i-th Gaussian component. In certain embodiment(s), the computing device may acquire parameters of the updated i-th Gaussian component as updated parameters. The computing device may acquire the difference between each updated parameter and the corresponding original parameter. If the differences between the updated parameters and the corresponding original parameters are less than a second difference threshold, it is determined that the updated i-th Gaussian component is in the convergent state.

In certain embodiment(s), the parameter of the updated i-th Gaussian component includes an updated expected value, and the updated expected value is used for indicating that a difference between the user characteristic data belonging to the updated i-th Gaussian component is within a difference range; and step S103 may include: when or in response to determining that the updated i-th Gaussian component is in the convergent state, which indicates that the updated i-th Gaussian component can more adequately describe the user characteristic data of users in the user set corresponding to the i-th Gaussian component, determining the updated expected value as the first key user characteristic data of the user set corresponding to the i-th Gaussian component.

If the updated i-th Gaussian component is in the convergent state, which indicates that the updated i-th Gaussian component can more adequately describe the user characteristic data, the updated expected value may be determined as the first key user characteristic data of the user set corresponding to the i-th Gaussian component. By clustering the at least two second users using the Gaussian mixture model, the dimensions of user characteristic data can be expanded by K times.

Figure 5:
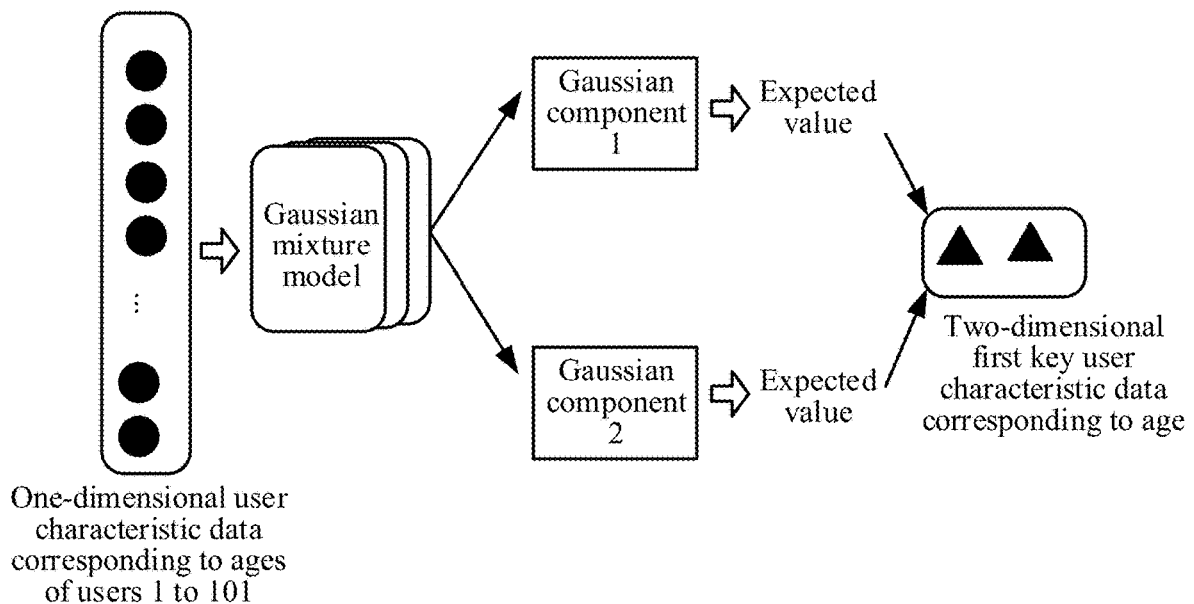
FIG. 5 is a schematic diagram of a scenario for generating first key user characteristic data corresponding to a user set according to embodiment(s) of the present disclosure.

For example, as shown in FIG. 5, it is assumed that the user characteristic data of the at least two second users is user characteristic data of the age attribute; and the friend users of the user 1 include users 2 to 101, and the category number corresponding to the age of the friend user is 2. In FIG. 5, black dots represent the user characteristic data of the friend users, and triangles represent the first key user characteristic data corresponding to the user sets. The computing device may acquire a Gaussian mixture model, where the Gaussian mixture model includes two Gaussian components, in certain embodiment(s), Gaussian component 1 and Gaussian component 2. The computing device may input the one-dimensional user characteristic data corresponding to the ages of the users 2 to 101 into the Gaussian mixture model to obtain two user sets, in certain embodiment(s), user set 1 and user set 2, where the user set 1 includes users 2 to 62, and the user set 2 includes users 63 to 101. Referring to FIG. 4, the user set 1 corresponds to the Gaussian component 1 of the Gaussian mixture model, and the user set 2 corresponds to the Gaussian component 2 of the Gaussian mixture model.

After acquiring the user sets, the computing device may update the Gaussian mixture model by performing the above steps 1 and 2. When the updated Gaussian mixture model is in the convergent state, in certain embodiment(s), when each Gaussian component of the updated Gaussian mixture model is in the convergent state, it is assumed that the expected values of the updated Gaussian component 1 and Gaussian component 2 are $\mu1$ and $\mu2$, respectively. The expected value $\mu1$ of the updated Gaussian component 1 may be used as the first key user characteristic data of the user set 1, and the expected value $\mu2$ of the updated Gaussian component 2 may be used as the first key user characteristic data of the user set 2. The first key user characteristic data of the user set 1 and the first key user characteristic data of the user set 2 are spliced to obtain two-dimensional first key user characteristic data. The two-dimensional first key user characteristic data may be expressed as ($\mu1$, $\mu2$) or ($\mu2$, $\mu1$).

It can be seen that the two-dimensional first key user characteristic data is twice as large as the one-dimensional user characteristic data corresponding to the ages of users 2 to 101. That is to say, by clustering the at least two second users, richer user characteristic data can be acquired, which can avoid the lack of key information in the user characteristic data of the friend users, and can also avoid overfitting of the machine learning model, and improve the accuracy of user profiles generated by the machine learning model. Herein, overfitting may mean that the machine learning model has relatively high accuracy in generating user profiles of a certain user or a certain type of user, but has relatively low accuracy in generating user profiles of other users.

In certain embodiment(s), step S104 may include the following steps s44 to s45.

s44: Generate friend user characteristic data according to the first key user characteristic data corresponding to each user set, wherein the friend user characteristic data is composed of an updated expected value corresponding to each Gaussian component.

The length of the friend user characteristic data is the number of updated expected values.

S45: Generate the user profile of the first user by using the friend user characteristic data and the user characteristic data of the first user.

In steps s44 to s45, the computing device may generate friend user characteristic data according to the first key user characteristic data corresponding to each user set, where the length of the friend user characteristic data is the number of updated expected values. One Gaussian component corresponds to one updated expected value. Therefore, the number of updated expected values is the number of Gaussian components. For example, if the number of Gaussian components of the Gaussian mixture model is 2, and each Gaussian component corresponds to one updated expected value, the number of updated expected values corresponding to the Gaussian components of the Gaussian mixture model is 2, in certain embodiment(s), the length of the friend user characteristic data may also be 2.

Since the user characteristic data of different users corresponds to the same category number and the number of Gaussian components of the Gaussian mixture model is the same as the category number corresponding to the user characteristic data, the user characteristic data of different users under the same user attribute corresponds to the same Gaussian component, in certain embodiment(s), the length of the friend user characteristic data corresponding to different users under the same user attribute is uniform (in certain embodiment(s), the same). For example, the user characteristic data is age, and the category number corresponding to age is 2, in certain embodiment(s), the categories include ages greater than an age threshold and ages less than or equal to the age threshold. The age threshold may be the age of the first user.

It is assumed that the user 1 has 10 friend users, and the user 2 has 8 friend users. Then the number of Gaussian components of each of the Gaussian mixture models respectively corresponding to the friend users of the user 1 and the friend users of the user 2 is 2. It is assumed that the friend users of the user 1 correspond to a Gaussian mixture model 1, the friend users of the user 2 correspond to a Gaussian mixture model 2, the Gaussian mixture model 1 includes a Gaussian component 1 and a Gaussian component 2, and the Gaussian mixture model 2 includes a Gaussian component 3 and a Gaussian component 4.

The computing device may cluster the friend users of the user 1 according to the Gaussian mixture model 1 to obtain two user sets, namely, a user set 1 and a user set 2, and cluster the friend users of the user 2 according to the Gaussian mixture model 2 to obtain two user sets, namely, a user set 3 and a user set 4. An updated expected value corresponding to the Gaussian component 1 is used as first key user characteristic data of the user set 1, and an updated expected value corresponding to the Gaussian component 2 is used as first key user characteristic data of the user set 2. The first key user characteristic data of the user set 1 and the first key user characteristic data of the user set 2 are used to generate friend user characteristic data 1, in certain embodiment(s), the friend user characteristic data 1 includes the updated expected value corresponding to the Gaussian component 1 and the updated expected value corresponding to the Gaussian component 2.

An updated expected value corresponding to the Gaussian component 3 is used as first key user characteristic data of the user set 3, and an updated expected value corresponding to the Gaussian component 4 is used as first key user characteristic data of the user set 4. The first key user characteristic data of the user set 3 and the first key user characteristic data of the user set 4 are used to generate friend user characteristic data 2, in certain embodiment(s), the friend user characteristic data 2 includes the updated expected value corresponding to the Gaussian component 3 and the updated expected value corresponding to the Gaussian component 4.

The lengths of the friend user characteristic data 1 corresponding to the user 1 and the friend user characteristic data 2 corresponding to the user 2 are both 2. That is to say, friend user characteristic data of a uniform length can be generated by using the Gaussian mixture models, in certain embodiment(s), the friend user characteristic data is not affected by the number of friend users. After generating the friend user characteristic data, the computing device may generate a user profile of the first user by using the friend user characteristic data and the user characteristic data of the first user.

In this embodiment, the original parameter includes an original expected value, and step s22 may include the following steps s51 to s53.

s51: Acquire a product of the user characteristic data of each of the at least two second users and the first probability to obtain a first value.

s52: Average the first values to obtain a second value, and use the second value as the updated expected value.

s53: Replace the original expected value of the i-th Gaussian component with the updated expected value to obtain the updated i-th Gaussian component.

In steps s51 to s53, the computing device may acquire a product of the user characteristic data of each of the at least two second users and the first probability to obtain a first value, and average the first values to obtain a second value, and use the second value as the updated expected value. For the updated expected value, reference may be made to the above formula (5). The averaging may refer to statistical averaging, arithmetic averaging processing, and so on. Further, the original expected value of the i-th Gaussian component is replaced with the updated expected value to obtain the updated i-th Gaussian component; an original covariance matrix of the i-th Gaussian component may be replaced with an updated covariance matrix, where for the updated covariance matrix, reference may be made to the above formula (6); and an original component weight of the i-th Gaussian component may be replaced with an updated component weight, where for the updated component weight, reference may be made to the above formula (3).

In certain embodiment(s), the parameter of the updated i-th Gaussian component further includes a component weight, and the step S104 may include the following steps s61 to s63:

s61: Sort the first key user characteristic data corresponding to each user set according to the component weight to obtain a sorting result.

s62: Select, by screening according to the sorting result, second key user characteristic data from the first key user characteristic data corresponding to each user set.

S63: Recognize the second key user characteristic data and the user characteristic data of the first user to obtain the user profile of the first user.

In steps s61 to s62, because a larger component weight indicates a more important Gaussian component, in certain embodiment(s), the first key user characteristic data of the user set corresponding to the Gaussian component is more significant, the computing device may sort the first key user characteristic data corresponding to each user set according to the component weight to obtain a sorting result, for example, sort the first key user characteristic data corresponding to each user set in descending order of the component weights to obtain the sorting result; and select, by screening, one or more pieces of first key user characteristic data that are ranked higher from the sorting result as the second key user characteristic data. After acquiring the second key user characteristic data, the computing device may recognize the second key user characteristic data and the user characteristic data of the first user to obtain the user profile of the first user. In this way, there may not be a need to process the first key user characteristic data corresponding to each user set, which improves the efficiency of user profile generation, saves resources, and reduces the complexity of user profile generation.

For example, in FIG. 4 above, when the updated Gaussian mixture model is in the convergent state, and assuming that the component weights of the updated Gaussian component 1 and Gaussian component 2 are w1 and w2 respectively and the expected values of the updated Gaussian component 1 and Gaussian component 2 are $\mu 1$ and $\mu 2$ respectively, the computing device may use the expected value $\mu 1$ of the updated Gaussian component 1 as the first key user characteristic data of the user set 1, and use the expected value $\mu 2$ of the updated Gaussian component 2 as the first key user characteristic data of the user set 2. If w1 is greater than w2, it indicates that the Gaussian component 1 can better fit the user characteristic data of the friend users of the user 1, in certain embodiment(s), the first key user characteristic data of the user set 1 corresponding to the Gaussian component 1 is more significant and representative, and has a greater impact on the user profile generation. Therefore, the first key user characteristic data corresponding to each user set is sorted according to the component weights, to obtain a sorting result, where the sorting result is ($\mu 1$, $\mu 2$), and $\mu 1$ may be used as the second user characteristic data.

If w1 is less than or equal to w2, it indicates that the Gaussian component 2 can better fit the user characteristic data of the friend users of the user 1, in certain embodiment(s), the first key user characteristic data of the user set 2 corresponding to the Gaussian component 2 is more significant and representative, and has a greater impact on the user profile generation. Therefore, the key user characteristic data corresponding to each user set is sorted according to the component weight, to obtain a sorting result, where the sorting result is ($\mu 2$, $\mu 1$), and $\mu 2$ may be used as the second user characteristic data. After acquiring the second user characteristic data, the computing device may use a machine learning model to recognize the second key user characteristic data and the user characteristic data of the first user to obtain a user profile of the first user.

In an embodiment, the above step S102 may include the following steps s71 and s72.

s71: Acquire a similarity between the user characteristic data of every two second users.

s72: Cluster the two second users whose similarity is greater than a similarity threshold, to obtain the at least two user sets.

In certain embodiment(s), clustering may be performed sequentially.

In steps s71 and s72, the computing device may compare the user characteristic data of every two second users, and acquire a similarity between the user characteristic data of the two second users by using a distance algorithm. The distance algorithm may include, but is not limited to, Manhattan distance algorithm, Euclidean distance algorithm, Chebyshev distance algorithm, and so on. After acquiring the similarities, the computing device may cluster the two second users whose similarity is greater than the similarity threshold to obtain the at least two user sets. The two second users with a high similarity are clustered into the same user set. If the similarities between a second user and other second users are too small, the second user may be regarded as a user set, or the second user may not be clustered.

In this an embodiment, the above s72 may include the following steps s81 to s83:

s81: Cluster the two second users whose similarity is greater than a similarity threshold, to obtain at least two candidate user sets.

s82: Acquire a category number corresponding to the user characteristic data of the at least two second users as a first number, and acquiring a number of the second users in each candidate user set as a second number.

s83: Select, by screening according to the first number and the second numbers, the at least two user sets from the at least two candidate user sets, wherein the second number corresponding to each of the at least two user sets is greater than a number threshold, and a number of user sets in the at least two user sets is the same as the first number.

In steps s81 to s83, the computing device may cluster the at least two second users by using a non-fixed clustering algorithm. In certain embodiment(s), because the numbers of user sets corresponding to friend users corresponding to different users may be different, the number of pieces of first key user characteristic data obtained may vary with different users, in certain embodiment(s), the length of user characteristic data may vary with different users. Therefore, in order to generate user characteristic data of a uniform length, the computing device may screen the user sets.

In certain embodiment(s), the computing device may cluster the two second users whose similarity is greater than the similarity threshold among the at least two second users to obtain at least two candidate user sets; acquire a category number corresponding to the user characteristic data of the at least two second users as a first number, and acquire a number of the second users in each of the at least two candidate user sets as a second number; and select, by screening according to the first number and the second numbers, the at least two user sets from the at least two candidate user sets, in certain embodiment(s), select the first number of candidate user sets each including a relatively large number of second users from the at least two candidate user sets as the at least two user sets.

Figure 6A:
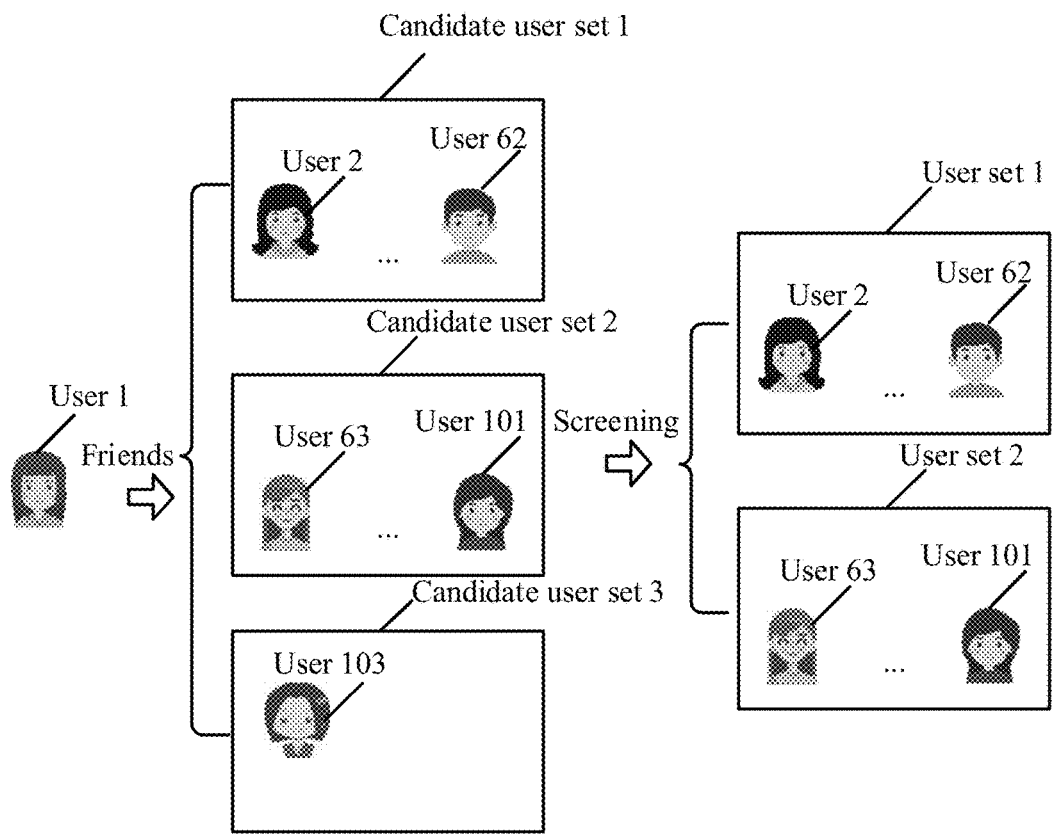
FIG. 6a is a schematic diagram of a scenario for clustering at least two second users according to embodiment(s) of the present disclosure.

For example, it is assumed that the second user characteristic data is user characteristic data of the age attribute, and the category number corresponding to the user characteristic data of the age attribute is 2. As shown in FIG. 6a, the friend users of the user 1 are clustered to obtain 3 candidate user sets, namely, a candidate user set 1, a candidate user set 2, and a candidate user set 3, where the candidate user set 1 includes users 2 to 62, the candidate user set 2 includes users 63 to 101, and the candidate user set 3 includes a user 103. The numbers of users in the candidate user set 1, the candidate user set 2, and the candidate user set 3 are 62, 48, and 1, respectively. The number of users in the candidate user set 1 and the number of users in the candidate user set 2 are both greater than the number of users in the candidate user set 3. Therefore, the computing device may select, by screening according to the numbers of users in the three candidate user sets, the candidate user set 1 and the candidate user set 2 as the user sets corresponding to the friend users of the user 1.

Figure 6B:
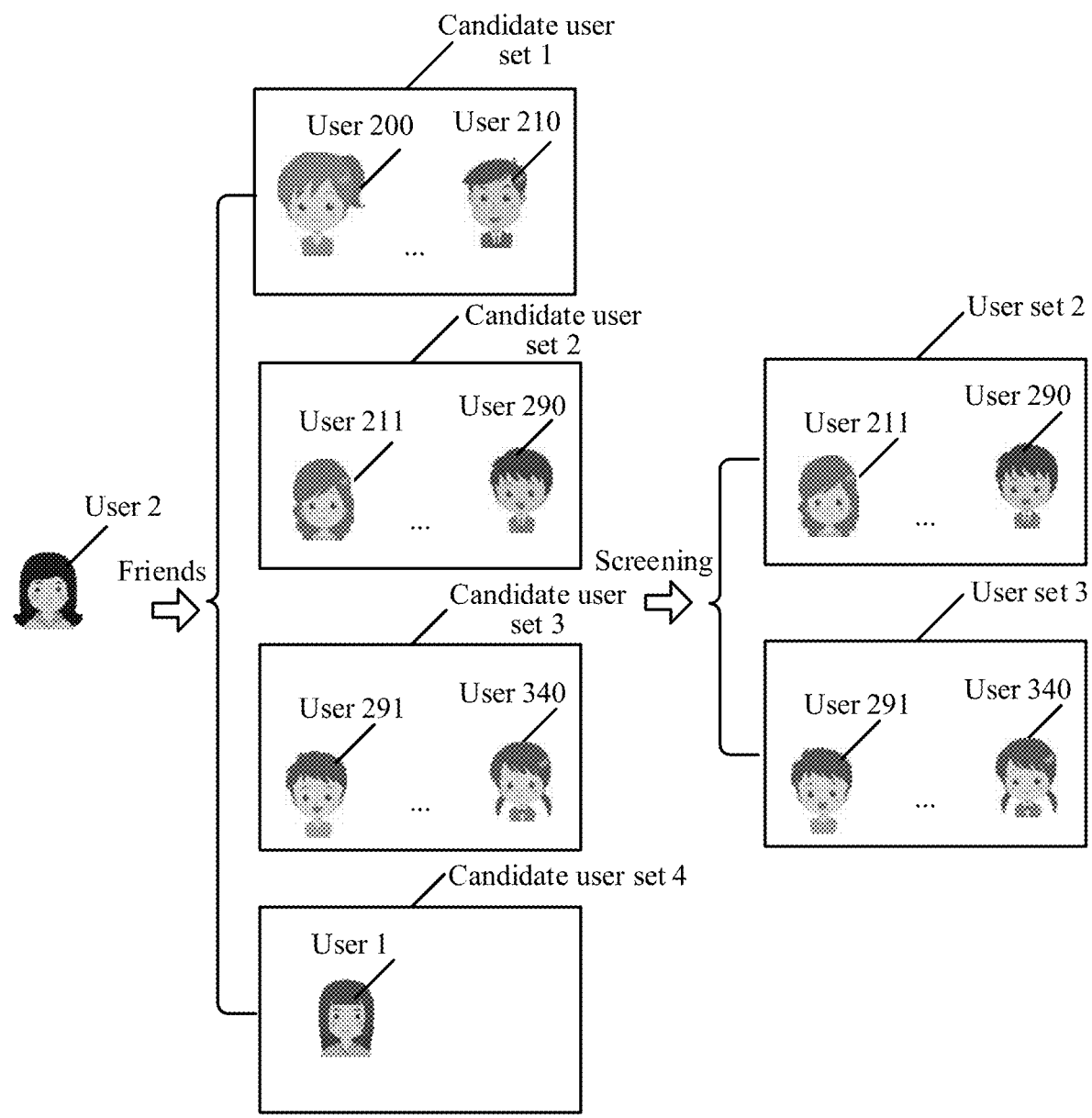
FIG. 6b is a schematic diagram of a scenario for clustering at least two second users according to embodiment(s) of the present disclosure.

As shown in FIG. 6b, the friend users of the user 2 are clustered to obtain 4 candidate user sets, namely, a candidate user set 1, a candidate user set 2, a candidate user set 3, and a candidate user Set 4. The candidate user set 1 includes users 200 to 210, the candidate user set 2 includes users 211 to 290, the candidate user set 3 includes users 291 to 340, and the candidate user set 4 includes the user 1. The numbers of users in the candidate user set 1, the candidate user set 2, the candidate user set 3, and the candidate user set 4 are 11, 80, 50, and 1, respectively. The numbers of user in the candidate user set 2 and the number of users in the candidate user set 3 are both greater than the number of users in the candidate user set 1 and the number of users in the candidate user set 4. Therefore, the computing device may select, by screening according to the numbers of users in the four candidate user sets, the candidate user set 2 and the candidate user set 3 as the user sets corresponding to the friend users of the user 2.

It can be seen from FIG. 6a and FIG. 6b that the numbers of candidate user sets obtained by clustering the friend users of different users are different, and the candidate user sets may be screened according to the numbers of users in the candidate user sets, so that each user can correspond to the same number of user sets, which is conducive to generating user characteristic data of a uniform length, and can improve the accuracy and efficiency of user profile generation.

In certain embodiment(s), step S103 may include: acquiring an average value of the user characteristic data of the second users in each user set, and determining the average value as the first key user characteristic data corresponding to the each user set.

The computing device may acquire an average value of the user characteristic data of the second users in each user set, and determine the average value as the first key user characteristic data corresponding to the each user set, in certain embodiment(s), the lengths of the first key user characteristic data corresponding to each user set are the same.

In certain embodiment(s), step S104 may include the following steps s84 to s85.

s84: Generate friend user characteristic data according to the first key user characteristic data corresponding to each user set, wherein the friend user characteristic data is composed of the first key user characteristic data of each user set, and the first key user characteristic data of each user set is an average value of the user characteristic data of the second users in each user set.

The length of the friend user characteristic data is the number of the average values of the user sets.

S85: Generate the user profile of the first user by using the friend user characteristic data and the user characteristic data of the first user.

In steps s84 to s85, the computing device may generate friend user characteristic data according to the first key user characteristic data corresponding to each user set. Each user set corresponds to one average value. Therefore, the length of the friend user characteristic data is related to the number of user sets in the at least two user sets. The number of user sets in the at least two user sets is the same as the first number (in certain embodiment(s), the category number corresponding to the user characteristic data of the at least two second users), and different users correspond to the same first number. Therefore, the lengths of the friend user characteristic data corresponding to different users are the same, in certain embodiment(s), by clustering the at least two user sets, friend user characteristic data of a uniform length can be generated. Further, a user profile of the first user may be generated according to the first key user characteristic data corresponding to each user set and the user characteristic data of the first user.

In one embodiment, the user characteristic data of each of the at least two second users includes M groups of user characteristic data of different user attributes; the user characteristic data of the first user includes N groups of user characteristic data of different user attributes; the M groups of user characteristic data of the different user attributes each have first key user characteristic data corresponding to each user set; M and N are both positive integers greater than 1.

The above step S104 may include the following steps s91 to s92.

s91: Splice the first key user characteristic data associated with the M groups of user characteristic data of the different user attributes with the N groups of user characteristic data of the different user attributes to obtain spliced user characteristic data.

s92: Recognize the spliced user characteristic data using a machine learning model to obtain the user profile of the first user.

In steps s91 to s92, the computing device may splice the first key user characteristic data associated with the M groups of user characteristic data of the different user attributes with the N groups of user characteristic data of the different user attributes to obtain spliced user characteristic data, in certain embodiment(s), use the spliced user characteristic data as the final user characteristic data of the first user; and recognize the spliced user characteristic data using a machine learning model to obtain the user profile of the first user.

Figure 7:
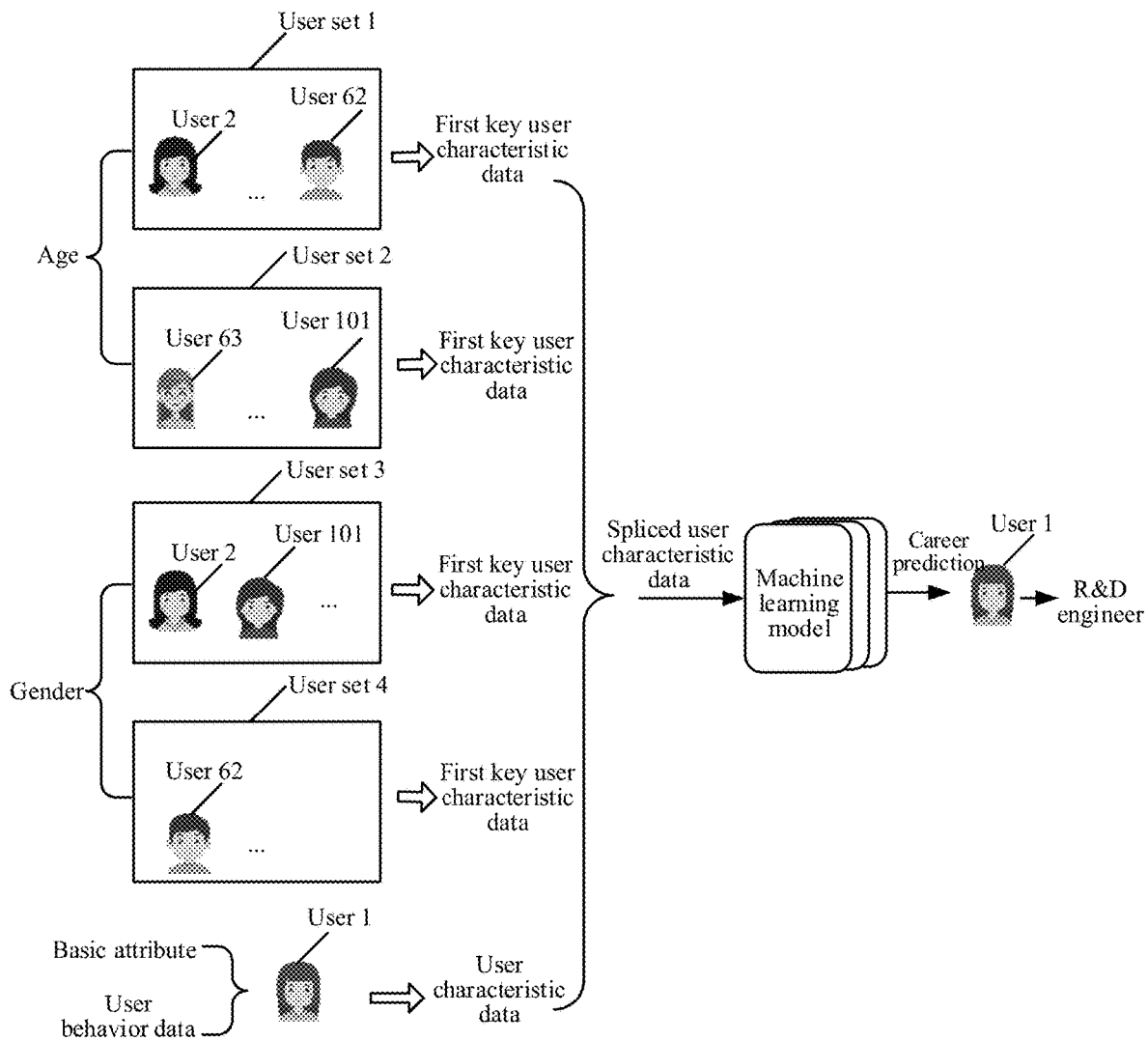
FIG. 7 is a schematic diagram of a scenario for generating a user profile according to embodiment(s) of the present disclosure.

For example, as shown in FIG. 7, the at least two second users (in certain embodiment(s), users 2 to 101) and the first user (in certain embodiment(s), user 1) respectively include user characteristic data of two sets of different user attributes, where the user characteristic data of the user 1 includes user characteristic data corresponding to the basic attribute and user characteristic data corresponding to behavior data, and the user characteristic data of the user 2 includes age or gender. The computing device may cluster the users 2 to 101 according to the ages corresponding to the users 2 to 101 to obtain 2 user sets, namely, a user set 1 and a user set 2, where the user set 1 includes users 2 to 62, and the user set 2 includes users 63 to 101. The computing device may calculate an average value of the ages of the users in the user set 1 as the first key user characteristic data corresponding to the user set 1, and calculate an average value of the ages of the users in the user set 2 as the first key user characteristic data corresponding to the user set 2.

The computing device may cluster the users 2 to 101 according to the genders corresponding to the users 2 to 101 to obtain 2 user sets, namely, a user set 3 and a user set 4, where the user set 3 includes females in the users 2 to 101, and the user set 4 includes males in the users 2 to 101. The computing device may use female as the first key user characteristic data of the user set 3 and male as the first key user characteristic data of the user set 4.

After acquiring the first key user characteristic data of each user set, the computing device may splice the first key user characteristic data with the user characteristic data of the user 1 to obtain spliced user characteristic data, and recognize the spliced user characteristic data using a machine learning model to obtain a user profile of the user 1. For example, the machine learning model is a machine learning model configured to recognize occupations of users. The machine learning model is used to recognize the spliced user characteristic data to obtain the occupation of the user 1, e.g., R&D engineer, product manager, animator, and so on. The user characteristic data of different sets of attributes of the friend users of the same user may correspond to the same or different user sets.

In one embodiment, the method may further include: acquiring at least two to-be-recommended service contents in response to a service content acquiring request; acquiring a degree of matching between the user profile of the first user and each of the at least two to-be-recommended service contents; and pushing the at least two to-be-recommended service contents to the first user according to the degree of matching.

After acquiring the user profile of the first user, the computing device may recommend a service content to the first user according to the user profile of the first user. In certain embodiment(s), the computing device may acquire at least two to-be-recommended service contents in response to a service content acquiring request. The service content may refer to commodity information corresponding to a commodity to be recommended or service information corresponding to a service to be recommended.

Further, the computing device may compare the user profile of the first user with each to-be-recommended service content to acquire a degree of matching between the user profile of the first user and each of the at least two to-be-recommended service contents. The degree of matching is used for indicating a degree to which the first user is interested in the to-be-recommended service content. A higher degree of matching indicates that the first user is more interested in the to-be-recommended service content; a lower degree of matching indicates that the first user is less interested in the to-be-recommended service content.

After acquiring the degrees of matching, the computing device may push the at least two to-be-recommended service contents to the first user according to the degrees of matching, in certain embodiment(s), may recommend the at least two to-be-recommended service contents to the first user in descending order of the degrees of matching. In this way, users can quickly browse the service contents they are interested in.

Figure 8:
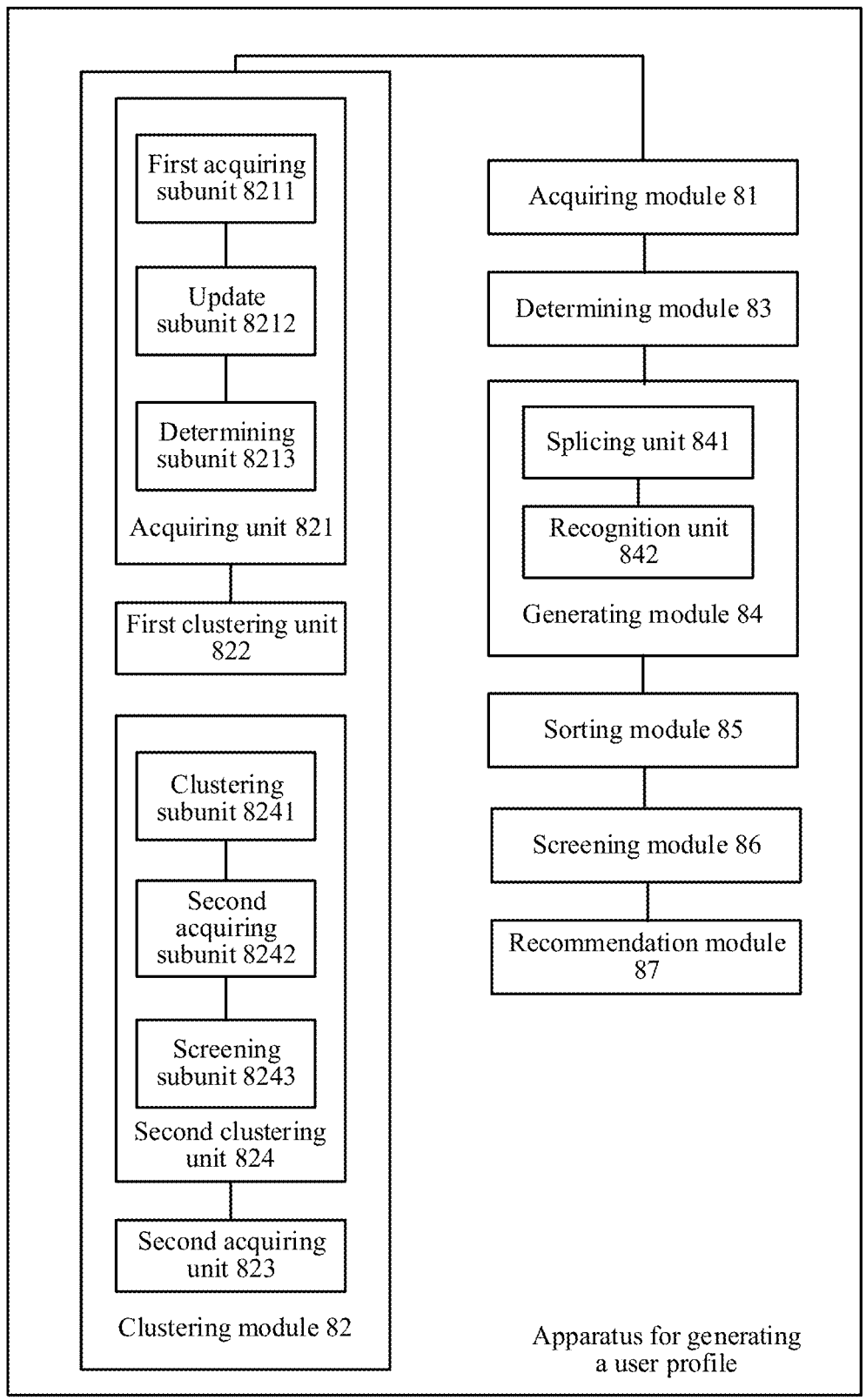
FIG. 8 is a schematic structural diagram of an apparatus for generating a user profile according to embodiment(s) of the present disclosure.

FIG. 8 is a schematic structural diagram of an apparatus for generating a user profile according to an embodiment of the present disclosure. The apparatus for generating a user profile may be a computer program (including program code) running in a computing device. For example, the apparatus for generating a user profile is an application software. The apparatus may be configured to execute the corresponding steps in the method provided in the embodiments of the present disclosure. As shown in FIG. 8, the apparatus for generating a user profile includes: an acquiring module 81, configured to acquire user characteristic data of a first user and user characteristic data of at least two second users, each of the at least two second users having a social relationship with the first user; a clustering module 82, configured to cluster the at least two second users to obtain at least two user sets, a similarity between the user characteristic data of any two second users in each user set satisfying a similarity condition; a determining module 83, configured to determine first key user characteristic data corresponding to each user set according to the user characteristic data of the second users in the each user set; and a generating module 84, configured to generate a user profile of the first user according to the first key user characteristic data corresponding to each user set and the user characteristic data of the first user.

In certain embodiment(s), the clustering module 82 includes: a first acquiring unit 821, configured to acquire a category number corresponding to the user characteristic data of the at least two second users as a first number; acquire a Gaussian mixture model according to the first number, where the Gaussian mixture model includes K Gaussian components, and K is the same as the first number; and acquire a probability that the user characteristic data of each of the at least two second users belongs to an i-th Gaussian component as a target probability, where i is a positive integer less than or equal to K; and a first clustering unit 822, configured to cluster the second users whose target probability is greater than a probability threshold among the at least two second users to obtain a user set corresponding to the i-th Gaussian component.

In certain embodiment(s), the first acquiring unit 821 includes: a first acquiring subunit 8211, configured to acquire the probability that the user characteristic data of each of the at least two second users belongs to the i-th Gaussian component as a first probability; an update subunit 8212, configured to update an original parameter of the i-th Gaussian component by using the first probability to obtain an updated i-th Gaussian component; and a determining subunit 8213, configured to determine the first probability as the target probability when or in response to determining that the updated i-th Gaussian component is in a convergent state.

In certain embodiment(s), the determining subunit 8213 is further configured to acquire the probability that the user characteristic data of each of the at least two second users belongs to the updated i-th Gaussian component as a second probability; acquire a difference between the first probability and the second probability; and when or in response to determining that the difference between the first probability and the second probability is less than a first difference threshold, determining that the updated i-th Gaussian component is in the convergent state.

In certain embodiment(s), the determining subunit 8213 is further configured to acquire a parameter of the updated i-th Gaussian component as an updated parameter; acquire a difference between the updated parameter and the original parameter; and when or in response to determining that the difference between the updated parameter and the original parameter is less than a second difference threshold, determine that the updated i-th Gaussian component is in the convergent state.

In certain embodiment(s), the parameter of the updated i-th Gaussian component includes an updated expected value, and the updated expected value is used for indicating that a difference between the user characteristic data belonging to the updated i-th Gaussian component is within a difference range; and the determining module 83 is configured to determine the updated expected value as the first key user characteristic data of the user set corresponding to the i-th Gaussian component when or in response to determining that the updated i-th Gaussian component is in the convergent state.

In certain embodiment(s), the generating module 84 is configured to generate friend user characteristic data according to the first key user characteristic data corresponding to each user set, wherein the friend user characteristic data is composed of an updated expected value corresponding to each Gaussian component; and generate the user profile of the first user by using the friend user characteristic data and the user characteristic data of the first user.

In certain embodiment(s), the original parameter includes an original expected value, and the update subunit 8212 is configured to acquire a product of the user characteristic data of each of the at least two second users and the first probability to obtain a first value; average the first values to obtain a second value, and use the second value as the updated expected value; and replace the original expected value of the i-th Gaussian component with the updated expected value to obtain the updated i-th Gaussian component.

In certain embodiment(s), the parameter of the updated i-th Gaussian component further includes a component weight, and the apparatus further includes: a sorting module 85, configured to sort the first key user characteristic data corresponding to each user set according to the component weight to obtain a sorting result; and a screening module 86, configured to select, by screening according to the sorting result, second key user characteristic data from the first key user characteristic data corresponding to each user set; and the generating module 84 is configured to recognize the second key user characteristic data and the user characteristic data of the first user to obtain the user profile of the first user.

In certain embodiment(s), the clustering module 82 further includes: a second acquiring unit 823, configured to acquire a similarity between the user characteristic data of every two second users; and a second clustering unit 824, configured to cluster the two second users whose similarity is greater than a similarity threshold, to obtain the at least two user sets.

In certain embodiment(s), the second clustering unit 824 includes: a clustering subunit 8241, configured to cluster the two second users whose similarity is greater than a similarity threshold, to obtain at least two candidate user sets; a second acquiring subunit 8242, configured to acquire a category number corresponding to the user characteristic data of the at least two second users as a first number, and acquiring a number of the second users in each candidate user set as a second number; and a screening subunit 8243, configured to select, by screening according to the first number and the second numbers, the at least two user sets from the at least two candidate user sets, wherein the second number corresponding to each of the at least two user sets is greater than a number threshold, and a number of user sets in the at least two user sets is the same as the first number.

In certain embodiment(s), the user characteristic data of each of the at least two second users includes M groups of user characteristic data of different user attributes; the user characteristic data of the first user includes N groups of user characteristic data of different user attributes; the M groups of user characteristic data of the different user attributes each have first key user characteristic data corresponding to each user set; M and N are both positive integers greater than 1; and the generating module 84 includes: a splicing unit 841, configured to splice the first key user characteristic data associated with the M groups of user characteristic data of the different user attributes with the N groups of user characteristic data of the different user attributes to obtain spliced user characteristic data; and a recognition unit 842, configured to recognize the spliced user characteristic data using a machine learning model to obtain the user profile of the first user.

In certain embodiment(s), the generating module is configured to generate friend user characteristic data according to the first key user characteristic data corresponding to each user set, wherein the friend user characteristic data is composed of the first key user characteristic data of each user set, and the first key user characteristic data of each user set is an average value of the user characteristic data of the second users in each user set; and generate the user profile of the first user by using the friend user characteristic data and the user characteristic data of the first user.

The apparatus further includes: a recommendation module 87, configured to acquire at least two to-be-recommended service contents in response to a service content acquiring request; acquire a degree of matching between the user profile of the first user and each of the at least two to-be-recommended service contents; and push the at least two to-be-recommended service contents to the first user according to the degree of matching.

It is to be understood that the apparatus for generating a user profile described in the embodiments of the present disclosure can execute the description of the method for generating a user profile in the embodiment corresponding to FIG. 3, and the description of the beneficial effects of using the same method will not be repeated.

In the embodiments of the present disclosure, the computing device may acquire the user characteristic data of the first user and the user characteristic data of at least two second users to avoid the problem that the amount of information provided by the user characteristic data of the first user is insufficient. That is, by acquiring the user characteristic data of the first user and the at least two second users, richer user characteristic data can be provided, so that a more informative user profile can be generated. After acquiring the user characteristic data, the computing device may cluster the at least two second users to obtain at least two user sets, and determine first key user characteristic data corresponding to each user set according to the user characteristic data of the second users in the each user set. The first key user characteristic data can reflect key information of the user characteristic data of the second user in the user set, in certain embodiment(s), the first key user characteristic data is more prominent and representative, and can truly reflect the distribution of user characteristic data of the friend users of the first user. Therefore, by acquiring the first key user characteristic data corresponding to each user set, the problem that a user profile cannot be more adequately generated due to the lack of key information of the user characteristic data of the second user can be avoided. Since the user characteristic data of the first user is similar to the user characteristic data of the second users, a user profile of the first user can be generated according to the user characteristic data of the first user and the first key user characteristic data of each user set. In this way, the accuracy of the user profile generated is improved.

Figure 9:
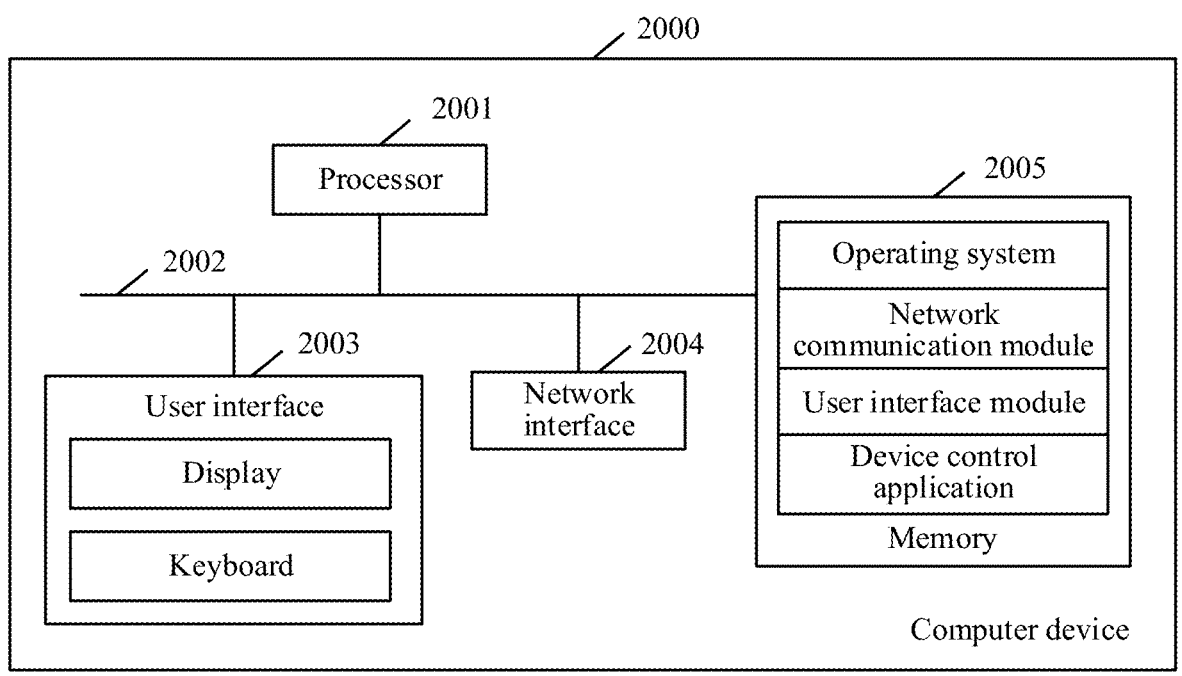
FIG. 9 is a schematic structural diagram of a computing device according to embodiment(s) of the present disclosure.

FIG. 9 is a schematic structural diagram of another computing device according to an embodiment of the present disclosure. As shown in FIG. 9, the computing device 2000 may include: a processor 2001, a network interface 2004, and a memory 2005. In addition, the computing device 2000 may further include: a user interface 2003 and at least one communication bus 2002. The communications bus 2002 is configured to implement connection and communication between these components. The user interface 2003 may include a display and a keyboard. In certain embodiment(s), the user interface 2003 may further include a standard wired interface and wireless interface. The network interface 2004 may include a standard wired interface and a wireless interface (such as a WI-FI interface). The memory 2005 may be a high-speed random access memory (RAM), or may be a non-volatile memory, for example, at least one magnetic disk storage. In certain embodiment(s), the memory 2005 may be at least one storage apparatus that is located far away from the processor 2001. As shown in FIG. 9, the memory 2005 as a computer-readable storage medium may include an operating system, a network communication module, a user interface module, and a device control application.

In the computing device 2000 shown in FIG. 9, the network interface 2004 is configured to provide a network communication function; the user interface 2003 is configured to provide an input interface for the user; and the processor 2001 may be configured to call the device control application stored in the memory 2005 to implement operations of: acquiring user characteristic data of a first user and user characteristic data of at least two second users, each of the at least two second users having a social relationship with the first user; clustering the at least two second users to obtain at least two user sets, a similarity between the user characteristic data of any two second users in each user set satisfying a similarity condition; determining first key user characteristic data corresponding to each user set according to the user characteristic data of the second users in the each user set; and generating a user profile of the first user according to the first key user characteristic data corresponding to each user set and the user characteristic data of the first user.

It is to be understood that the computing device 2000 described in the embodiments of the present disclosure can execute the description of the method for generating a user profile in the embodiment corresponding to FIG. 3, and can also execute the description of the apparatus for generating a user profile in the embodiment corresponding to FIG. 8. In addition, the description of the beneficial effects of using the same method will not be repeated.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the embodiments of the present disclosure, the computing device may acquire the user characteristic data of the first user and the user characteristic data of at least two second users to avoid the problem that the amount of information provided by the user characteristic data of the first user is insufficient. That is, by acquiring the user characteristic data of the first user and the at least two second users, richer user characteristic data can be provided, so that a more informative user profile can be generated. After acquiring the user characteristic data, the computing device may cluster the at least two second users to obtain at least two user sets, and determine first key user characteristic data corresponding to each user set according to the user characteristic data of the second users in the each user set. The first key user characteristic data can reflect key information of the user characteristic data of the second user in the user set, in certain embodiment(s), the first key user characteristic data is more prominent and representative, and can truly reflect the distribution of user characteristic data of the friend users of the first user. Therefore, by acquiring the first key user characteristic data corresponding to each user set, the problem that a user profile cannot be more adequately generated due to the lack of key information of the user characteristic data of the second user can be avoided. Since the user characteristic data of the first user is similar to the user characteristic data of the second users, a user profile of the first user can be generated according to the user characteristic data of the first user and the first key user characteristic data of each user set. In this way, the accuracy of the user profile generated is improved.

In addition, the embodiments of the present disclosure further provide a computer-readable storage medium. The computer-readable storage medium stores a computer program executed by the apparatus for generating a user profile, and the computer program includes program instructions. When executing the program instructions, the processor can implement the descriptions of the method for generating a user profile in the embodiment corresponding to FIG. 3. Therefore, the details will not be described herein again. In addition, the description of the beneficial effects of using the same method will not be repeated. For technical details that are not disclosed in the embodiments of the computer-readable storage medium of the present disclosure, refer to the method embodiments of the present disclosure. In an example, the program instructions may be deployed to be executed on a computing device, or deployed to be executed on a plurality of computing devices at the same location, or deployed to be executed on a plurality of computing devices distributed in a plurality of locations and interconnected via a communication network. The plurality of computing devices distributed in the plurality of locations and interconnected via the communication network may consititue a blockchain system.

Persons of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The storage medium may be a magnetic disk, an optical disc, a read-only memory (ROM), or a random access memory (RAM).

The contents disclosed above are merely exemplary embodiments of the present disclosure, and are not intended to limit the scope of the claims of the present disclosure. Therefore, equivalent variations made in accordance with the claims of the present disclosure shall fall within the scope of the present disclosure.

What is claimed is:

1. A method for generating a user profile, executed by a computing device, the method comprising:
  acquiring user characteristic data of a first user and user characteristic data of at least two second users, each of the at least two second users having a social relationship with the first user;
  clustering the at least two second users to obtain at least two user sets, a similarity between the user characteristic data of any two second users in each user set satisfying a similarity condition;
  determining first key user characteristic data corresponding to the each user set according to the user characteristic data of the second users in the each user set; and
  generating a user profile of the first user according to the first key user characteristic data corresponding to the each user set and the user characteristic data of the first user,
  wherein clustering the at least two second users comprises:
    acquiring a category number corresponding to the user characteristic data of the at least two second users as a first number;
    acquiring a Gaussian mixture model according to the first number, where the Gaussian mixture model includes K Gaussian components, and K is the same as the first number;
    acquiring a probability that the user characteristic data of each of the at least two second users belongs to an i-th Gaussian component as a target probability, where i is a positive integer less than or equal to K; and
    clustering the second users whose target probability is greater than a probability threshold among the at least two second users to obtain a user set corresponding to the i-th Gaussian component.

2. The method according to claim 1, wherein acquiring the probability comprises:
  acquiring the probability that the user characteristic data of each of the at least two second users belongs to the i-th Gaussian component as a first probability;
  updating an original parameter of the i-th Gaussian component by using the first probability to obtain an updated i-th Gaussian component; and
  determining the first probability as the target probability in response to determining that the updated i-th Gaussian component is in a convergent state.

3. The method according to claim 2, further comprising:
  acquiring the probability that the user characteristic data of each of the at least two second users belongs to the updated i-th Gaussian component as a second probability;
  acquiring a difference between the first probability and the second probability; and
  in response to determining that the difference between the first probability and the second probability is less than a first difference threshold, determining that the updated i-th Gaussian component is in the convergent state.

4. The method according to claim 2, further comprising:
  acquiring a parameter of the updated i-th Gaussian component as an updated parameter;
  acquiring a difference between the updated parameter and the original parameter; and
  in response to determining that the difference between the updated parameter and the original parameter is less than a second difference threshold, determining that the updated i-th Gaussian component is in the convergent state.

5. The method according to claim 2, wherein the parameter of the updated i-th Gaussian component includes an updated expected value, and the updated expected value indicates that a difference between the user characteristic data belonging to the updated i-th Gaussian component is within a difference range, and wherein determining the first key user characteristic data comprises:
  determining the updated expected value as the first key user characteristic data of the user set corresponding to the i-th Gaussian component in response to determining that the updated i-th Gaussian component is in the convergent state.

6. The method according to claim 5, wherein generating the user profile comprises:
  generating friend user characteristic data according to the first key user characteristic data corresponding to each user set, wherein the friend user characteristic data is composed of an updated expected value corresponding to each Gaussian component; and
  generating the user profile of the first user by using the friend user characteristic data and the user characteristic data of the first user.

7. The method according to claim 5, wherein the original parameter includes an original expected value, and updating the original parameter of the i-th Gaussian component comprises:
  acquiring a product of the user characteristic data of each of the at least two second users and the first probability to obtain a first value;
  averaging the first values to obtain a second value, and using the second value as the updated expected value; and
  replacing the original expected value of the i-th Gaussian component with the updated expected value to obtain the updated i-th Gaussian component.

8. The method according to claim 5, wherein the parameter of the updated i-th Gaussian component further includes a component weight, and generating the user profile of the first user comprises:
  sorting the first key user characteristic data corresponding to each user set according to the component weight to obtain a sorting result;
  selecting, by screening according to the sorting result, second key user characteristic data from the first key user characteristic data corresponding to each user set; and
  recognizing the second key user characteristic data and the user characteristic data of the first user to obtain the user profile of the first user.

9. The method according to claim 1, wherein clustering the at least two second users comprises:
  acquiring a similarity between the user characteristic data of every two second users; and clustering the two second users whose similarity is greater than a similarity threshold, to obtain the at least two user sets.

10. The method according to claim 9, wherein clustering the two second users comprises:
clustering the two second users whose similarity is greater than a similarity threshold, to obtain at least two candidate user sets;
acquiring a category number corresponding to the user characteristic data of the at least two second users as a first number, and acquiring a number of the second users in each candidate user set as a second number; and
selecting, by screening according to the first number and the second numbers, the at least two user sets from the at least two candidate user sets, wherein the second number corresponding to each of the at least two user sets is greater than a number threshold, and a number of user sets in the at least two user sets is the same as the first number.

11. The method according to claim 1, wherein generating the user profile of the first user comprises:
generating friend user characteristic data according to the first key user characteristic data corresponding to each user set, wherein the friend user characteristic data is composed of the first key user characteristic data of each user set, and the first key user characteristic data of each user set is an average value of the user characteristic data of the second users in each user set; and
generating the user profile of the first user by using the friend user characteristic data and the user characteristic data of the first user.

12. An apparatus for generating a user profile, comprising: at least one memory storing computer program instructions; and at least one processor coupled to the at least one memory and configured to execute the computer program instructions and perform:
acquiring user characteristic data of a first user and user characteristic data of at least two second users, each of the at least two second users having a social relationship with the first user;
clustering the at least two second users to obtain at least two user sets, a similarity between the user characteristic data of any two second users in each user set satisfying a similarity condition;
determining first key user characteristic data corresponding to the each user set according to the user characteristic data of the second users in the each user set; and
generating a user profile of the first user according to the first key user characteristic data corresponding to the each user set and the user characteristic data of the first user,
wherein clustering the at least two second users comprises:
acquiring a category number corresponding to the user characteristic data of the at least two second users as a first number;
acquiring a Gaussian mixture model according to the first number, where the Gaussian mixture model includes K Gaussian components, and K is the same as the first number;
acquiring a probability that the user characteristic data of each of the at least two second users belongs to an i-th Gaussian component as a target probability, where i is a positive integer less than or equal to K; and
clustering the second users whose target probability is greater than a probability threshold among the at least two second users to obtain a user set corresponding to the i-th Gaussian component.

13. The apparatus according to claim 12, wherein acquiring the probability includes:
acquiring the probability that the user characteristic data of each of the at least two second users belongs to the i-th Gaussian component as a first probability;
updating an original parameter of the i-th Gaussian component by using the first probability to obtain an updated i-th Gaussian component; and
determining the first probability as the target probability in response to determining that the updated i-th Gaussian component is in a convergent state.

14. The apparatus according to claim 13, wherein the parameter of the updated i-th Gaussian component includes an updated expected value, and the updated expected value indicates that a difference between the user characteristic data belonging to the updated i-th Gaussian component is within a difference range, and wherein determining the first key user characteristic data includes:
determining the updated expected value as the first key user characteristic data of the user set corresponding to the i-th Gaussian component in response to determining that the updated i-th Gaussian component is in the convergent state.

15. The apparatus according to claim 14, wherein the parameter of the updated i-th Gaussian component further includes a component weight, and wherein generating the user profile of the first user includes:
sorting the first key user characteristic data corresponding to each user set according to the component weight to obtain a sorting result; and
selecting, by screening according to the sorting result, second key user characteristic data from the first key user characteristic data corresponding to each user set; and
recognizing the second key user characteristic data and the user characteristic data of the first user to obtain the user profile of the first user.

16. The apparatus according to claim 12, wherein generating the user profile of the first user includes:
generating friend user characteristic data according to the first key user characteristic data corresponding to each user set, wherein the friend user characteristic data is composed of the first key user characteristic data of each user set, and the first key user characteristic data of each user set is an average value of the user characteristic data of the second users in each user set; and
generating the user profile of the first user by using the friend user characteristic data and the user characteristic data of the first user.

17. A non-transitory computer-readable storage medium storing computer program instructions executable by at least one processor to perform:
acquiring user characteristic data of a first user and user characteristic data of at least two second users, each of the at least two second users having a social relationship with the first user;
clustering the at least two second users to obtain at least two user sets, a similarity between the user characteristic data of any two second users in each user set satisfying a similarity condition;

determining first key user characteristic data corresponding to the each user set according to the user characteristic data of the second users in the each user set; and generating a user profile of the first user according to the first key user characteristic data corresponding to the each user set and the user characteristic data of the first user, wherein clustering the at least two second users comprises:

acquiring a category number corresponding to the user characteristic data of the at least two second users as a first number;

acquiring a Gaussian mixture model according to the first number, where the Gaussian mixture model includes K Gaussian components, and K is the same as the first number;

acquiring a probability that the user characteristic data of each of the at least two second users belongs to an i-th Gaussian component as a target probability, where i is a positive integer less than or equal to K; and clustering the second users whose target probability is greater than a probability threshold among the at least two second users to obtain a user set corresponding to the i-th Gaussian component.

* * * * *